US010952231B2

United States Patent
Liou

(10) Patent No.: US 10,952,231 B2
(45) Date of Patent: Mar. 16, 2021

(54) METHOD AND APPARATUS FOR BEAM INDICATION FOR UPLINK TRANSMISSION IN A WIRELESS COMMUNICATION SYSTEM

(71) Applicant: ASUSTek Computer Inc., Taipei (TW)

(72) Inventor: Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/388,141

(22) Filed: Apr. 18, 2019

(65) Prior Publication Data

US 2019/0349964 A1    Nov. 14, 2019

Related U.S. Application Data

(60) Provisional application No. 62/669,703, filed on May 10, 2018.

(51) Int. Cl.
*H04W 72/12* (2009.01)
*H04W 76/27* (2018.01)
(Continued)

(52) U.S. Cl.
CPC ...... *H04W 72/1268* (2013.01); *H04B 7/0617* (2013.01); *H04B 7/0626* (2013.01);
(Continued)

(58) Field of Classification Search
CPC ............. H04W 72/14; H04W 72/1268; H04W 72/1289; H04W 88/02; H04W 88/08;
(Continued)

(56) References Cited

U.S. PATENT DOCUMENTS 9,225,503 B2    12/2015   Kim et al.
2017/0048039 A1   2/2017   Zhao et al.
(Continued)

FOREIGN PATENT DOCUMENTS

CN    108260217    7/2018

OTHER PUBLICATIONS

3GPP TS 38.214: Technical Specification Group Radio Access Network NR, Physical layer procedures for data (Release 15) V15.1.0 (Mar. 2018) (Year: 2018).*
(Continued)

*Primary Examiner* — Jung Liu
(74) *Attorney, Agent, or Firm* — Skaar Ulbrich Macari, P.A.

(57) ABSTRACT

A method and apparatus are disclosed from the perspective of a User Equipment (UE). In one embodiment, the method includes the UE is configured with a first serving cell, and is indicated to activate the first serving cell and an active UL BWP, wherein the first serving cell or the active UL BWP is not configured with Physical Uplink Control Channel (PUCCH) resource(s). The method further includes the UE does not expect to be indicated to transmit a first Physical Uplink Shared Channel (PUSCH) in the first serving cell or the active UL BWP in Radio Resource Control (RRC) connected mode, wherein the first PUSCH is scheduled by a Downlink Control Information (DCI) format without spatial relation field.

18 Claims, 19 Drawing Sheets

(51) Int. Cl.
*H04B 7/06* (2006.01)
*H04L 5/00* (2006.01)
*H04W 72/04* (2009.01)

(52) U.S. Cl.
CPC ......... *H04L 5/0051* (2013.01); *H04W 72/042* (2013.01); *H04W 72/046* (2013.01); *H04W 76/27* (2018.02)

(58) Field of Classification Search
CPC ............. H04W 16/14; H04W 72/1215; H04W 72/1294; H04L 5/0023; H04L 27/2613; H04L 1/0068; H04L 5/001; H04L 5/0087; H04L 5/0092; H04L 5/1469; H04L 27/2602; H04J 2211/006; H04J 11/00
See application file for complete search history.

(56) References Cited

U.S. PATENT DOCUMENTS

| | | | | |
|---|---|---|---|---|
| 2017/0325258 | A1* | 11/2017 | Nogami | H04L 5/0087 |
| 2018/0042043 | A1 | 2/2018 | Babaei et al. | |
| 2018/0279331 | A1* | 9/2018 | Shaheen | H04W 72/042 |
| 2018/0279353 | A1* | 9/2018 | Shaheen | H04W 72/1289 |
| 2018/0287682 | A1* | 10/2018 | Kwak | H04L 5/0057 |
| 2019/0090261 | A1* | 3/2019 | Yang | H04L 1/1664 |
| 2019/0097861 | A1* | 3/2019 | Kawasaki | H04W 72/02 |
| 2019/0103943 | A1* | 4/2019 | Wang | H04L 1/1854 |
| 2019/0149365 | A1* | 5/2019 | Chatterjee | H04L 5/0092 370/329 |
| 2019/0150174 | A1* | 5/2019 | Kim | H04L 25/02 370/330 |
| 2019/0208540 | A1* | 7/2019 | Kim | H04W 74/006 |
| 2019/0246378 | A1* | 8/2019 | Islam | H04L 1/1896 |
| 2019/0254071 | A1* | 8/2019 | Park | H04W 72/042 |
| 2019/0273637 | A1* | 9/2019 | Zhang | H04B 5/0031 |
| 2019/0274032 | A1* | 9/2019 | Chatterjee | H04W 48/12 |
| 2019/0297605 | A1* | 9/2019 | Kim | H04L 5/0094 |
| 2019/0313342 | A1* | 10/2019 | Papasakellariou | H04W 52/146 |
| 2019/0320457 | A1* | 10/2019 | Maaref | H04W 72/1289 |

OTHER PUBLICATIONS

Qualcomm Incorporated: "Beam management for NR", 3GPP Draft; R1-1804787, 3rd Generation Partnership Project (3GPP), Mobile Competence Centre ; 650, Route Des Lucioles ; F-06921 Sophia-Antipolis Cedex ; France vol. RAN WG1, No. Sanya, China; Apr. 16, 2018-Apr. 20, 2018 Apr. 7, 2018.

Ericsson: "Feature lead summary 3 on beam measurement and reporting"5 3GPP Draft; R1-1803417, 3rd Generation Partnership Project (3GPP), Mobile Competence Centre ; 650, Route Des Lucioles ; F-06921 Sophia-Antipolis Cedex ;Franc vol. RAN WG1, No. Athens, Greece; Feb. 26, 2018-Mar. 2, 2018 Feb. 26, 2018 (Feb. 26, 2018).

European Search Report in corresponding EP Application No. 19170151.5, dated Sep. 9, 2019.

* cited by examiner

| Value of UL/SUL indicator | Uplink |
|---|---|
| 0 | The non-supplementary uplink |
| 1 | The supplementary uplink |

FIG. 5 (PRIOR ART)

| Value of the Redundancy version field | Value of $rv_d$ to be applied |
|---|---|
| 00 | 0 |
| 01 | 1 |
| 10 | 2 |
| 11 | 3 |

FIG. 6 (PRIOR ART)

| Value of BWP indicator field 2 bits | Bandwidth part |
|---|---|
| 00 | First bandwidth part configured by higher layers |
| 01 | Second bandwidth part configured by higher layers |
| 10 | Third bandwidth part configured by higher layers |
| 11 | Fourth bandwidth part configured by higher layers |

FIG. 7 (PRIOR ART)

| Value of SRS request field | Triggered aperiodic SRS resource set(s) |
|---|---|
| 00 | No aperiodic SRS resource set triggered |
| 01 | SRS resource set(s) configured with higher layer parameter *aperiodicSRS-ResourceTrigger* set to 1 |
| 10 | SRS resource set(s) configured with higher layer parameter *aperiodicSRS-ResourceTrigger* set to 2 |
| 11 | SRS resource set(s) configured with higher layer parameter *aperiodicSRS-ResourceTrigger* set to 3 |

FIG. 8 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

FIG. 9 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|  |  | 4 | 0,2 | 4 | 0,1 |
|  |  | 5 | 1,2 | 5 | 0,2 |
|  |  | 6-7 | reserved | 6 | 0,3 |
|  |  |  |  | 7 | 1,2 |
|  |  |  |  | 8 | 1,3 |
|  |  |  |  | 9 | 2,3 |
|  |  |  |  | 10-15 | reserved |

FIG. 10 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|   |   | 4 | 0,2 | 4 | 0,1 |
|   |   | 5 | 1,2 | 5 | 0,2 |
|   |   | 6 | 0,1,2 | 6 | 0,3 |
|   |   | 7 | reserved | 7 | 1,2 |
|   |   |   |   | 8 | 1,3 |
|   |   |   |   | 9 | 2,3 |
|   |   |   |   | 10 | 0,1,2 |
|   |   |   |   | 11 | 0,1,3 |
|   |   |   |   | 12 | 0,2,3 |
|   |   |   |   | 13 | 1,2,3 |
|   |   |   |   | 14-15 | reserved |

FIG. 11 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|  |  | 4 | 0,2 | 4 | 0,1 |
|  |  | 5 | 1,2 | 5 | 0,2 |
|  |  | 6 | 0,1,2 | 6 | 0,3 |
|  |  | 7 | reserved | 7 | 1,2 |
|  |  |  |  | 8 | 1,3 |
|  |  |  |  | 9 | 2,3 |
|  |  |  |  | 10 | 0,1,2 |
|  |  |  |  | 11 | 0,1,3 |
|  |  |  |  | 12 | 0,2,3 |
|  |  |  |  | 13 | 1,2,3 |
|  |  |  |  | 14 | 0,1,2,3 |
|  |  |  |  | 15 | reserved |

FIG. 12 (PRIOR ART)

| Bit field mapped to index | SRI(s), $N_{SRS}=2$ |
|---|---|
| 0 | 0 |
| 1 | 1 |

FIG. 13 (PRIOR ART)

| Bit field mapped to index | VRB-to-PRB mapping |
|---|---|
| 0 | Non-interleaved |
| 1 | Interleaved |

FIG. 14 (PRIOR ART)

| Bit field mapped to index | PUSCH frequency hopping |
|---|---|
| 0 | Disabled |
| 1 | Enabled |

METHOD AND APPARATUS FOR BEAM INDICATION FOR UPLINK TRANSMISSION IN A WIRELESS COMMUNICATION SYSTEM

CROSS-REFERENCE TO RELATED APPLICATIONS

The present application claims the benefit of U.S. Provisional Patent Application Ser. No. 62/669,703 filed on May 10, 2018, the entire disclosure of which is incorporated herein in its entirety by reference.

FIELD

This disclosure generally relates to wireless communication networks, and more particularly, to a method and apparatus for beam indication for uplink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE is configured with a first serving cell, and is indicated to activate the first serving cell and an active UL BWP, wherein the first serving cell or the active UL BWP is not configured with Physical Uplink Control Channel (PUCCH) resource(s). The method further includes the UE does not expect to be indicated to transmit a first Physical Uplink Shared Channel (PUSCH) in the first serving cell or the active UL BWP in Radio Resource Control (RRC) connected mode, wherein the first PUSCH is scheduled by a Downlink Control Information (DCI) format without spatial relation field.

BRIEF DESCRIPTION OF THE DRAWINGS

FIG. 5 is a reproduction of Table 7.3.1.1.1-1 of 3GPP TS 38.212 (as included in 3GPP R1-1805794).

FIG. 6 is a reproduction of Table 7.3.1.1.1-2 of 3GPP TS 38.212 (as included in 3GPP R1-1805794).

FIG. 7 is a reproduction of Table 7.3.1.1.2-1 of 3GPP TS 38.212 (as included in 3GPP R1-1805794).

FIG. 8 is a reproduction of Table 7.3.1.1.2-24 of 3GPP TS 38.212 (as included in 3GPP R1-1805794).

FIG. 9 is a reproduction of Table 7.3.1.1.2-28 of 3GPP TS 38.212 (as included in 3GPP R1-1805794).

FIG. 10 is a reproduction of Table 7.3.1.1.2-29 of 3GPP TS 38.212 (as included in 3GPP R1-1805794).

FIG. 11 is a reproduction of Table 7.3.1.1.2-30 of 3GPP TS 38.212 (as included in 3GPP R1-1805794).

FIG. 12 is a reproduction of Table 7.3.1.1.2-31 of 3GPP TS 38.212 (as included in 3GPP R1-1805794).

FIG. 13 is a reproduction of Table 7.3.1.1.2-32 of 3GPP TS 38.212 (as included in 3GPP R1-1805794).

FIG. 14 is a reproduction of Table 7.3.1.1.2-33 of 3GPP TS 38.212 (as included in 3GPP R1-1805794).

FIG. 15 is a reproduction of Table 7.3.1.1.2-34 of 3GPP TS 38.212 (as included in 3GPP R1-1805794).

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: Final Report of 3GPP TSG RAN WG1 #85 v1.0.0 (Nanjing, China, 23-27 May 2016); Final Report of 3GPP TSG RAN WG1 #86 v1.0.0 (Gothenburg, Sweden, 22-26 Aug. 2016); Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 #AH1_NR v1.0.0 (Spokane, USA, 16-20 Jan. 2017); Final Report of 3GPP TSG RAN WG1 #88 v1.0.0 (Athens, Greece, 13-17 Feb. 2017); Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 #AH_NR2 v1.0.0 (Qingdao, China, 27-30 Jun. 2017); Final Report of 3GPP TSG RAN WG1 Meeting #90 (Prague, Czech Republic, 21-25 Aug. 2017); Final Report of 3GPP TSG RAN WG1 Meeting #AH_NR3 (Nagoya, Japan, 18-21 Sep. 2017); Final Report of 3GPP TSG RAN WG1 Meeting #90bis (Prague, Czech Republic, 9-13 Oct. 2017); Final Report of 3GPP TSG RAN WG1 Meeting #91 (Reno, USA, 27 Nov.-1 Dec. 2017); Final Report of 3GPP TSG RAN WG1 #AH1_1801 v1.0.0 (Vancouver, Canada, 22-26 Jan. 2018); Draft Report of 3GPP TSG RAN WG1 Meeting #92 v0.2.0 (Athens, Greece, 26 Feb.-2 Mar. 2018); and Final Report of 3GPP TSG RAN WG1 #92bis; R1-1805794, "CR to TS 38.212 capturing the RAN1#92bis meeting agreements", Huawei; R1-1805795, "CR to TS 38.213 capturing the RAN1#92bis meeting agreements", Samsung; R1-1805796, "CR to TS 38.214 capturing the RAN1#92bis meeting agreements", Nokia; and TS 38.331 V15.1.0 (2018-03), "3rd Generation Partnership Project; Technical Specification Group Radio Access Network; NR; Radio Resource Control (RRC) protocol specification (Release 15)". The standards and documents listed above are hereby expressly incorporated by reference in their entirety.

Figure 1:
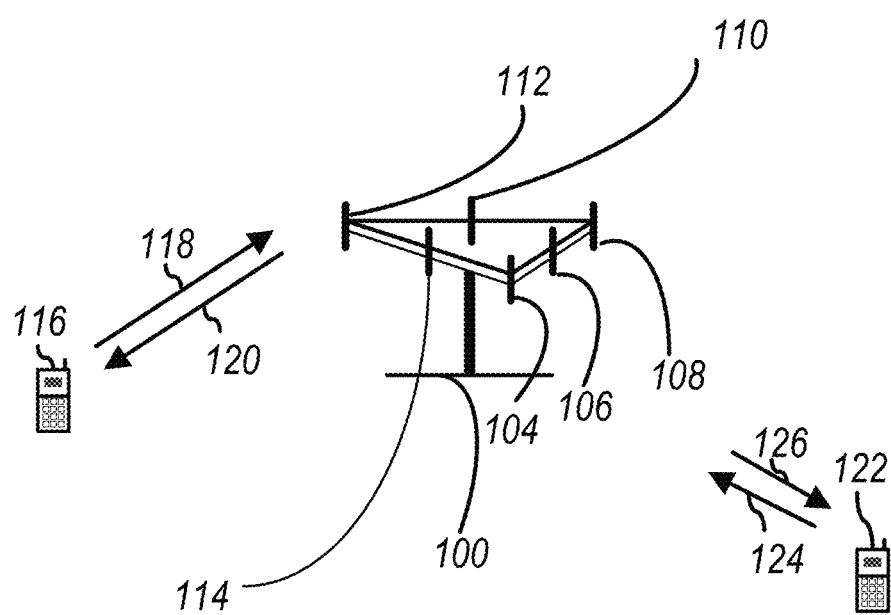
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as a network, an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
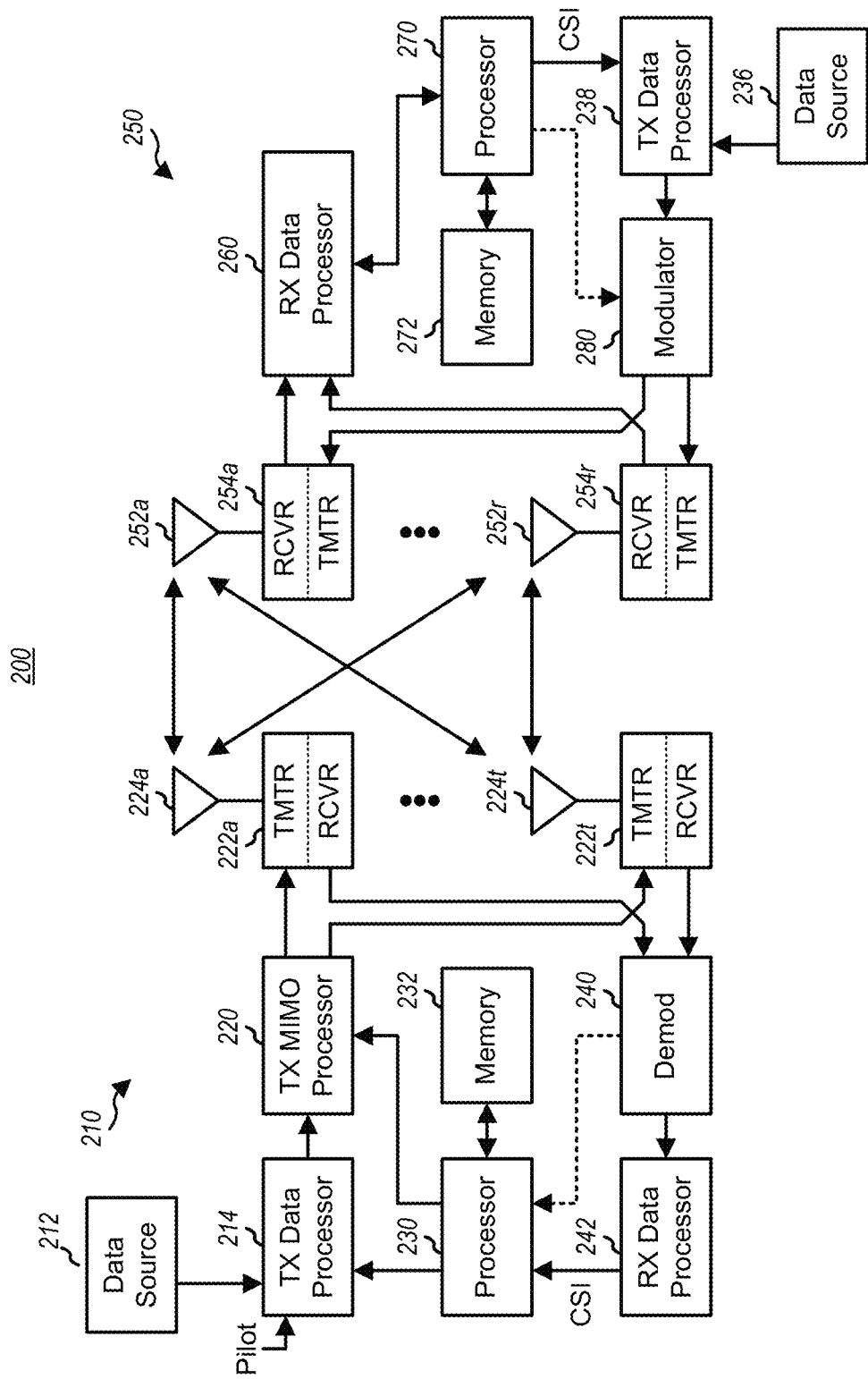
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
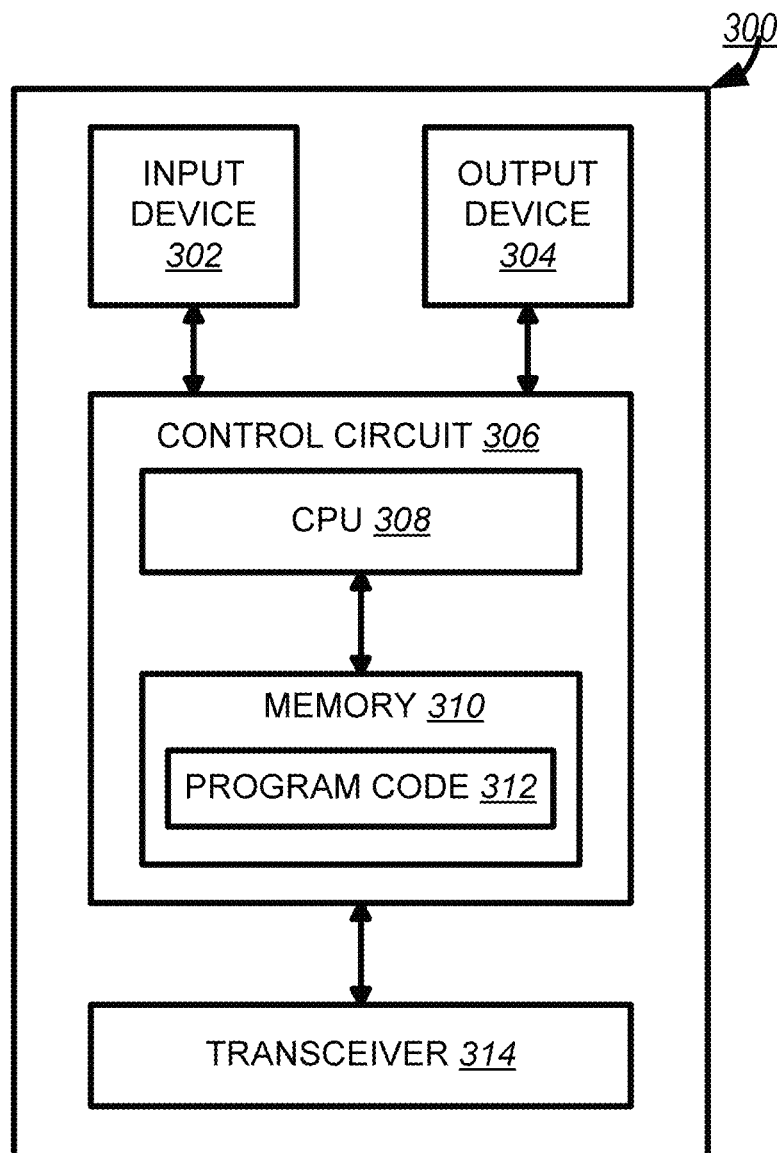
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
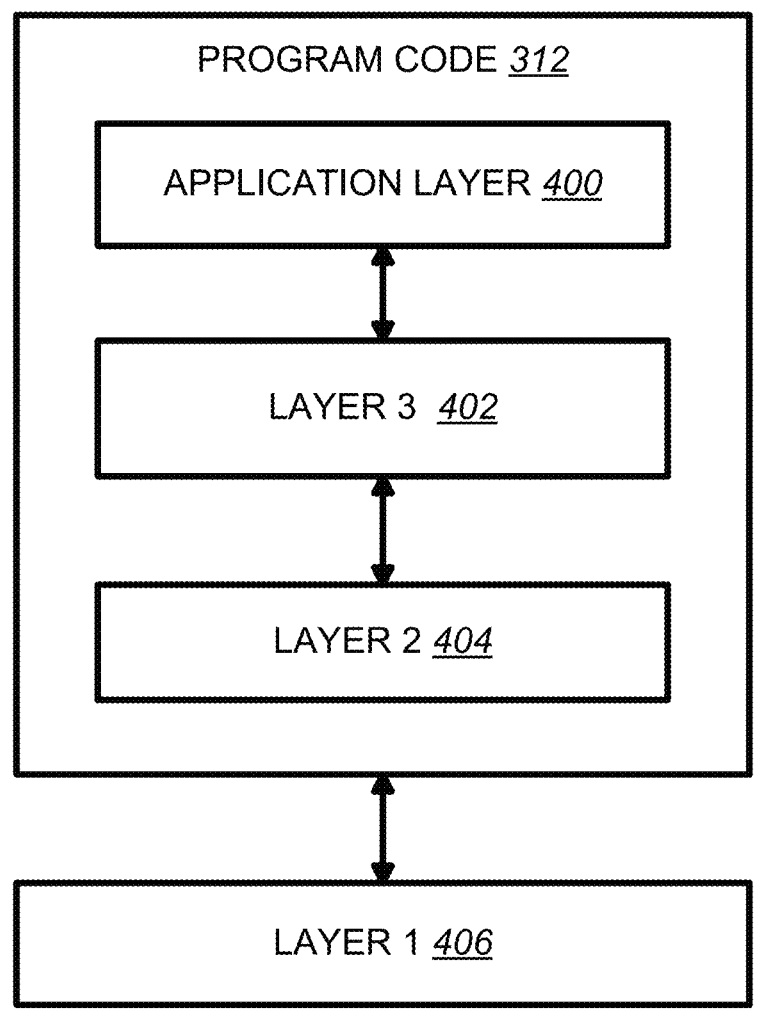
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

There are some agreements on beam management in RAN1 #85 meeting, as described in the Final Report of 3GPP TSG RAN WG1 #85 v1.0.0 (Nanjing, China, 23-27 May 2016) as follows:

Agreements:
  Following three implementations of beamforming are to be studied in NR
    Analog beamforming
    Digital beamforming
    Hybrid beamforming
    Note: The physical layer procedure design for NR can be agnostic to UE/TRP with respect to the beamforming implementations employed at TRP/UE, but it may pursue beamforming implementation specific optimization not to lose efficiency
  RAN1 studies both multi-beam based approaches and single-beam based approaches for these channels/signals/measurement/feedback
    Initial-access signals (synchronization signals and random access channels)
    System-information delivery
    RRM measurement/feedback
    L1 control channel
    Others are FFS
    Note: The physical layer procedure design for NR can be unified as much as possible whether multi-beam or single-beam based approaches are employed at TRP at least for synchronization signal detection in stand-alone initial access procedure
    Note: single beam approach can be a special case of multi beam approach
    Note: Individual optimization of single beam approach and multiple beam approach is possible
  Multi-beam based approaches
    In Multi-beam based approaches, multiple beams are used for covering a DL coverage area and/or UL coverage distance of a TRP/a UE
    One example of multi-beam based approaches is beam sweeping:
      When beam sweeping is applied for a signal (or a channel), the signal (the channel) is transmitted/received on multiple beams, which are on multiple time instances in finite time duration
        Single/multiple beam can be transmitted/received in a single time instance
    Others are FFS
  Single-beam based approaches
    In single-beam based approaches, the single beam can be used for covering a DL coverage area and/or UL coverage distance of a TRP/a UE, similarly as for LTE cell-specific channels/RS
  For both single-beam and multi-beam based approaches, RAN1 can consider followings in addition
    Power boosting
    SFN
    Repetition
    Beam diversity (only for multi-beam approach)
    Antenna diversity
    Other approaches are not precluded
  Combinations of single-beam based and multi-beam based approaches are not precluded
[ . . . ]
Agreements:
  The following techniques are studied for NR UL MIMO
    Uplink transmission/reception schemes for data channels
      Non reciprocity based UL MIMO (e.g. PMI based)
      Reciprocity based UL MIMO. E.g. UE derives precoder based on downlink RS measurement (including partial reciprocity)
      Support of MU-MIMO
      Open-loop/Close-loop single/Multi point spatial multiplexing
        e.g. for multi point SM, multi layer is received either jointly or independently by different TRPs
        Note: for multi point SM, multiple point may have coordination
      Single/Multi panel spatial diversity
      Uplink antenna/panel switching (UE side)
      UL beamforming management for analog implementation
      Combination of above techniques
    UL RS design considering the below functions
      Sounding
      Demodulation
      Phase noise compensation
    UL transmit power/timing advance control in the context of UL MIMO Transmission scheme(s) for carrying UL control information There are some agreements on beam management in RAN1 #86 meeting, as described in the Final Report of 3GPP TSG RAN WG1 #86 v1.0.0 (Gothenburg, Sweden, 22-26 Aug. 2016) as follows:

Agreements:
  The following DL L1/L2 beam management procedures are supported within one or multiple TRPs:
    P-1: is used to enable UE measurement on different TRP Tx beams to support selection of TRP Tx beams/UE Rx beam(s)
      For beamforming at TRP, it typically includes a intra/inter-TRP Tx beam sweep from a set of different beams
      For beamforming at UE, it typically includes a UE Rx beam sweep from a set of different beams
      FFS: TRP Tx beam and UE Rx beam can be determined jointly or sequentially
    P-2: is used to enable UE measurement on different TRP Tx beams to possibly change inter/intra-TRP Tx beam(s)
      From a possibly smaller set of beams for beam refinement than in P-1
      Note: P-2 can be a special case of P-1
    P-3: is used to enable UE measurement on the same TRP Tx beam to change UE Rx beam in the case UE uses beamforming
    Strive for the same procedure design for Intra-TRP and inter-TRP beam management
      Note: UE may not know whether it is intra-TRP or inter TRP beam
    Note: Procedures P-2&P-3 can be performed jointly and/or multiple times to achieve e.g. TRP Tx/UE Rx beam change simultaneously
    Note: Procedures P-3 may or may not have physical layer procedure spec. impact
    Support managing multiple Tx/Rx beam pairs for a UE
    Note: Assistance information from another carrier can be studied in beam management procedures
    Note that above procedure can be applied to any frequency band
    Note that above procedure can be used in single/multiple beam(s) per TRP
    Note: multi/single beam based initial access and mobility treated within a separate RAN1 agenda item
R1-168468 Definitions Supporting Beam Related Procedures Nokia, Qualcomm, CATT, Intel, NTT DoCoMo, Mediatek, Ericsson, ASB, Samsung, LGE
{
  Beam management=a set of L1/L2 procedures to acquire and maintain a set of TRP(s) and/or UE beams that can be used for DL and UL transmission/reception, which include at least following aspects:
    Beam determination=for TRP(s) or UE to select of its own Tx/Rx beam(s).
    Beam measurement=for TRP(s) or UE to measure characteristics of received beamformed signals
    Beam reporting=for UE to report information a property/quality of beamformed signal(s) based on beam measurement
    Beam sweeping=operation of covering a spatial area, with beams transmitted and/or received during a time interval in a predetermined way.
}

There are some agreements on beam management in RAN1 #86bis meeting, as described in the Final Report of 3GPP TSG RAN WG1 #86bis v1.0.0 (Lisbon, Portugal, 10-14 Oct. 2016) as follows:

Working Assumptions:
  Beam management procedures can utilize at least the following RS type(s):
    RS defined for mobility purpose at least in connected mode
      FFS: RS can be NR-SS or CSI-RS or newly designed RS
      Others are not precluded
    CSI-RS:
      CSI-RS is UE-specifically configured
        Multiple UE may be configured with the same CSI-RS
      The signal structure for CSI-RS can be specifically optimized for the particular procedure
      Note: CSI-RS can also be used for CSI acquisition
    Other RS could also be considered for beam management such as DMRS and synchronization signals Agreements:
  For downlink, NR supports beam management with and without beam-related indication
    When beam-related indication is provided, information pertaining to UE-side beamforming/receiving procedure used for data reception can be indicated through QCL to UE
    FFS: Information other than QCL
  For downlink, based on RS (used for beam management) transmitted by TRP, UE reports information associated with N selected Tx beams
    Note: N can be equal to 1
[ . . . ]
Working Assumption:
  The followings are defined as Tx/Rx beam correspondence at TRP and UE:
  Tx/Rx beam correspondence at TRP holds if at least one of the following is satisfied:
    TRP is able to determine a TRP Rx beam for the uplink reception based on UE's downlink measurement on TRP's one or more Tx beams.
    TRP is able to determine a TRP Tx beam for the downlink transmission based on TRP's uplink measurement on TRP's one or more Rx beams
  Tx/Rx beam correspondence at UE holds if at least one of the following is satisfied:
    UE is able to determine a UE Tx beam for the uplink transmission based on UE's downlink measurement on UE's one or more Rx beams.
    UE is able to determine a UE Rx beam for the downlink reception based on TRP's indication based on uplink measurement on UE's one or more Tx beams.
[ . . . ]
Agreements:
  UL beam management is to be further studied in NR
    Similar procedures can be defined as DL beam management with details FFS, e.g.:
      U-1: is used to enable TRP measurement on different UE Tx beams to support selection of UE Tx beams/TRP Rx beam(s)
        Note: this is not necessarily useful in all cases
      U-2: is used to enable TRP measurement on different TRP Rx beams to possibly change/select inter/intra-TRP Rx beam(s)

U-3: is used to enable TRP measurement on the same TRP Rx beam to change UE Tx beam in the case UE uses beamforming There are some agreements on beam management in RAN1 #87 meeting, as described in the Final Report of 3GPP TSG RAN WG1 #87 v1.0.0 (Reno, USA, 14-18 Nov. 2016) as follows:

Agreements:
Companies are encouraged to refine the definition of beam correspondence, if necessary
Note: whether or not to introduce this definition in NR is a separate topic
Under the refined definition of beam correspondence (if any), study whether or not mechanism(s) for determining UE's beam correspondence is needed.
the study may consider the following aspects—
e.g. metrics to be considered SNR/Power (beam-quality), CSI, and others
e.g. values of the metrics at which beam correspondence is declared
e.g., complexity/overhead
e.g., possibility of supporting reporting to the gNB about beam correspondence at the UE

[ . . . ]

Agreements:
NR supports with and without a downlink indication to derive QCL assumption for assisting UE-side beam-forming for downlink control channel reception There are some agreements on beam management in RAN1 #AH1_NR meeting, as described in the Final Report of 3GPP TSG RAN WG1 #AH1_NR v1.0.0 (Spokane, USA, 16-20 Jan. 2017) as follows:

Agreement:
For the definition of beam correspondence:
Confirm the previous working assumption of the definition
Note: this definition/terminology is for convenience of discussion Agreement:
Support capability indication of UE beam correspondence related information to TRP

[ . . . ]

Agreements:
For NR UL, support transmissions of SRS precoded with same and different UE Tx beams within a time duration
Detailed FFS, including the resulting overhead, time duration (e.g., one slot), and configuration, e.g., in the following:
Different UE Tx beam: FFS per SRS resource and/or per SRS port
Same UE Tx beam across ports: for a given SRS resource and/or a set of SRS resources

[ . . . ]

Agreements:
For reception of DL control channel, support indication of spatial QCL assumption between an DL RS antenna port(s), and DL RS antenna port(s) for demodulation of DL control channel
Note: Indication may not be needed for some cases:
For reception of DL data channel, support indication of spatial QCL assumption between DL RS antenna port(s) and DMRS antenna port(s) of DL data channel
Different set of DMRS antenna port(s) for the DL data channel can be indicated as QCL with different set of RS antenna port(s)
Option 1: Information indicating the RS antenna port(s) is indicated via DCI
FFS: whether the information indicating the RS antenna port(s) will be assumed only for the scheduled "PDSCH" or until the next indication
Option 2: Information indicating the RS antenna port(s) is indicated via MAC-CE, and will be assumed until the next indication
Option 3: Information indicating the RS antenna port(s) is indicated via a combination of MAC CE and DCI
At least one option is supported
FFS: whether to support either or both options
Note: Indication may not be needed for some cases:

There are some agreements on beam management in RAN1 #88 meeting, as described in the Final Report of 3GPP TSG RAN WG1 #88 v1.0.0 (Athens, Greece, 13-17 Feb. 2017) as follows:

Agreements:
For reception of unicast DL data channel, support indication of spatial QCL assumption between DL RS antenna port(s) and DMRS antenna port(s) of DL data channel: Information indicating the RS antenna port(s) is indicated via DCI (downlink grants)
The information indicates the RS antenna port(s) which is QCL-ed with DMRS antenna port(s)
Note: related signalling is UE-specific There are some agreements on beam management in RAN1 #88bis meeting, as described in the Final Report of 3GPP TSG RAN WG1 #88bis v1.0.0 (Spokane, USA, 3-7 Apr. 2017) as follows:

Agreements:
Aim for low-overhead indication for spatial QCL assumption to assist UE-side beamforming/receiving
FFS details (e.g., tag-based where the tag refers to previous CSI-RS resources, BPL-based, referring to previous measurement reports, indication one resource (set) out of multiple resource (set)s configured by RRC, CSI-RS resource/port index based, etc.)

[ . . . ]

Agreements:
Confirm the WA from RAN1 AH1701 with the following update:
NR supports at least one NW-controlled mechanism for beam management for UL transmission(s)
At least when beam correspondence does not hold
Considering at least SRS to support U-1/U-2/U-3 procedures
FFS the details There are some agreements on beam management in RAN1 #89 meeting, as described in the Final Report of 3GPP TSG RAN WG1 #89 v1.0.0 (Hangzhou, China, 15-19 May 2017) as follows:

Agreements:
Support spatial QCL assumption between antenna port(s) within a CSI-RS resource(s) and antenna port of an SS Block (or SS block time index) of a cell
The other QCL parameters not precluded
Note: default assumption may be no QCL
Configuration of QCL for UE specific NR-PDCCH is by RRC and MAC-CE signalling
Note that MAC-CE is not always needed
Note: For example, DL RS QCLed with DMRS of PDCCH for delay spread, Doppler spread, Doppler shift, and average delay parameters, spatial parameters

[ . . . ]

Agreements:
　NR supports CSI-RS configuration to support Tx and/or Rx beam sweeping for beam management conveying at least the following information
　　Information related to CSI-RS resource configuration
　　　E.g., CSI-RS RE pattern, number of CSI-RS antenna ports, CSI-RS periodicity (if applicable) etc.
　　Information related to number of CSI-RS resources
　　Information related to number of time-domain repetitions (if any) associated with each CSI-RS resource
[ . . . ]
Agreements:
　For aperiodic SRS transmission triggered by single aperiodic SRS triggering field, the UE can be configured to transmit N(N>1) SRS resources for UL beam management There are some agreements on beam management in RAN1 #90 meeting, as described in the Final Report of 3GPP TSG RAN WG1 Meeting #90 v1.0.0 (Prague, Czech Rep, 21-25 Aug. 2017) as discussed below. One agreement is related to beam indication of unicast PDSCH which is indicated in a DCI.
Agreements:
　Support UE to provide information to gNB to assist UL beam management
　　The information can be a number representing the amount of SRS resources required for UE Tx beam training
　　　Note: these set of SRS resources are associated with a set of Tx beams There are some agreements on beam management in RAN1 #AH_NR3 meeting, as described in the Final Report of 3GPP TSG RAN WG1 Meeting #AH_NR3 (Nagoya, Japan, 18-21 Sep. 2017) as follows:
Agreement:
A UE is RRC configured with a list of up to M candidate Transmission Configuration Indication (TCI) states at least for the purposes of QCL indication
　Whether M equal to or larger than $2^N$ is for further study, where N is the size of the DCI field for PDSCH
　Each TCI state can be configured with one RS Set
　Each ID (FFS: details of ID) of DL RS at least for the purpose of spatial QCL in an RS Set can refer to one of the following DL RS types:
　　SSB
　　Periodic CSI-RS
　　Aperiodic CSI-RS
　　Semi-persistent CSI-RS
[ . . . ]
Agreement:
The QCL configuration for PDCCH contains the information which provides a reference to a TCI state Alt 1: The QCL configuration/indication is on a per CORESET basis
　　The UE applies the QCL assumption on the associated CORESET monitoring occasions. All search space(s) within the CORESET utilize the same QCL.
　Alt 2: The QCL configuration/indication is on a per search space basis
　　The UE applies the QCL assumption on an associated search space. This could mean that in the case where there are multiple search spaces within a CORESET, the UE may be configured with different QCL assumptions for different search spaces.
　Note: The indication of QCL configuration is done by RRC or RRC+MAC CE (FFS: by DCI) Note: The above options are provided as input to the control channel agenda item discussion
[ . . . ]
Agreement:
　For QCL indication for PDSCH:
　　When TCI states are used for QCL indication, the UE receives an N-bit TCI field in DCI
　　　The UE assumes that the PDSCH DMRS is QCL with the DL RS(s) in the RS Set corresponding to the signaled TCI state
　　Whether or not the TCI field is always present in a given DL-related DCI is FFS There are some agreements on beam management in RAN1 #90bis meeting, as described in the Final Report of 3GPP TSG RAN WG1 Meeting #90bis v1.0.0 (Prague, Czech Republic, 9-13 Oct. 2017) as follows:
Agreement:
Support at least the explicit approach for the update of spatial QCL reference in a TCI state.
　FFS: Additional support for implicit update.
　Note: In the explicit approach, the TCI state is updated using either RRC or RRC+MAC-CE based approach
　Note: In the implicit approach, when a set of aperiodic CSI-RS resources are triggered, the triggering DCI includes a TCI state index which provides spatial QCL reference for the triggered set of CSI-RS resources. Following the measurement, the spatial QCL reference in the RS set corresponding to the indicated TCI state is updated based on the preferred CSI-RS determined by the UE. Other operations of implicit approaches are not precluded.
Agreement:
　NR adopts the SRS Tx beam indication, i.e., by a SRS resource or by a DL RS
　　The DL RS supported at least include CSI-RS and SSB.
　NR supports the indication of at least the spatial relations between the DL RS and the UL SRS Tx beam via at least the following mechanisms.

| Spatial parameter | Reference RS | Target RS | Signalling mode |
|---|---|---|---|
| Spatial | SSB/CSI-RS (at least P-CSIRS and SP-CSI-RS), P-SRS<br>FFS: AP-CSI-RS, SP-SRS | P SRS | RRC |
| Spatial | SSB/CSI-RS(at least P-CSIRS and SP-CSI-RS), P-SRS/SP-SRS<br>FFS: AP-SRS, AP-CSI-RS | SP-SRS | RRC + MAC-CE |
| Spatial | SSB/CSI-RS (at least P-CSIRS and SP-CSI-RS), P-SRS, SP-SRS, AP-SRS<br>Working assumption: AP-CSI-RS | AP SRS | RRC or RRC + MAC CE for configuration, indication with DCI |

FFS: The use of spatial relation across CCs and/or BWPs.

Agreement:
Working assumption from RAN1#90 is confirmed:
  For beam management CSI-RS, NR supports higher layer configuration of a set of single-symbol CSI-RS resources where
    The set configuration contains an information element (IE) indicating whether repetition is "on/off"
  Note: In this context, repetition "on/off" means:
    "On": The UE may assume that the gNB maintains a fixed Tx beam
    "Off": The UE can not assume that the gNB maintains a fixed Tx beam
  Note: This does NOT necessarily mean that the CSI-RS resources in a set occupy adjacent symbols
Furthermore, the following details are agreed
  CSI-RS resources in the resource set are TDMed if repetition is ON
    If repetition is ON, The UE does not expect different values for the following parameters across different CSI-RS resources within a resource set
      Transmission periodicity
      Number of antenna port subject to RAN4 decision
      FFS for other parameters
Agreement:
NR supports the following configurations for beam management where a resource set is formed from multiple beam management CSI-RS resources and is contained within a resource setting:
  Single resource set with repetition="OFF"
    UE reports CSI-RS resource indicator(s) within this resource set for CRI feedback
  Single resource set with repetition="ON"
    UE does not report CRI
  FFS: Further support additional configuration by down selection from the following two alternatives:
    (a) Multiple resource sets, all with repetition="ON"
      UE reports CSI-RS resource set indicator(s) for CRI feedback
    (b) Multiple equal-size resource sets, all with repetition="OFF"
      UE reports distinct local CSI-RS resource indicator(s) within one or more resource sets. The UE can assume that the gNB applies the same Tx beams in the same order for each of the sets
  Note: Not all configurations are applicable for P1/P2/P3
[ . . . ]
Agreement:
The contents of R1-1719059 are approved with the following clarifications and modification
  Slide 2: (Modification) Add N=3
  Slide 3: (Clarification) For uplink BM, multiple SRS resource sets can be configured
  For all slides: (Clarification) RRC parameter list refers to SRS resource set and previous agreements refer to SRS groups. Both are the same thing.
{
  Proposal: UL beam management
    NR supports gNB configuration of transmitting SRS with same Tx beam across multiple symbols via either of followings
      configuring one SRS resource spanning multiple symbols
      configuring UE to apply the same Tx beam across the SRS resources in a SRS resource set.
    UE can apply different Tx beams to different SRS resources if it is not configured to apply the same Tx beam across SRS resources in a SRS resource set, where the beams can be determined either (1) via a gNB-transparent way, or (2) via gNB indication.
    NR supports the gNB to configure the UE to apply same Tx power on SRS resources within a SRS resource set for UL beam management.
    After receiving the SRS, NR supports gNB to update the SRS resource within the SRS resource set for beam management by RRC.
  Proposal: Update the association of TCI state and DL RS
    Initialization/Update of the ID of a DL RS(s) in the RS Set used at least for spatial QCL purposes is done at least via explicit signalling. Support the following methods for the explicit signalling:
      RRC
      RRC+MAC-CE
  [ . . . ]
  Proposal: Presence of TCI in DCI
    For the case when at least spatial QCL is configured/indicated, support higher-layer UE-specific configuration of whether or not TCI field is present in DL-related DCI
      Not present: No dynamic indication of QCL parameters for PDSCH is provided in DL-related DCI
        For PDSCH, UE applies higher-layer signalling of QCL parameters/indication for determining QCL parameters except for the case of beam management without beam-related indication where no spatial QCL parameters are higher layer configured
      Present: Details on next proposal.
      Proposed candidate solutions should consider
        Below and above 6 GHz DL beam related operation with and without beam indication
        Downlink beam management with and without beam indication (ref Annex)
    Note: this proposal does not apply to the case of beam management without beam-related indication
  Proposal: Timing issue of beam indication for PDSCH
    For the case when at least spatial QCL is configured/indicated, NR supports the beam indication for PDSCH as follows, if TCI field is present:
      The TCI field is always present in the associated DCI for PDSCH scheduling irrespective of same-slot scheduling or cross-slot scheduling.
      If the scheduling offset<threshold K: PDSCH uses a pre-configured/pre-defined/rule-based spatial assumption
        Threshold K can be based on UE capability only if multiple candidate values of K are supported.
      If the scheduling offset>=threshold K: PDSCH uses the beam (spatial QCL parameter) indicated by the N-bit TCI field in the assignment DCI.
    Note: this proposal does not apply to the case of beam management without beam-related indication
}
[ . . . ]
[90b-NR-17]—Sundar (Qualcomm)
Emails discussion to finalize the parameter list for BM, until October 27th.
Done: As per RAN1 chair's decision posted on November 7th, the following is agreed:
Agreements:
  Support parameter Is-TCI-Present
    Whether for the case when at least spatial QCL is configured/indicated, if TCI field is present or not present in DL-related DCI. FFS: Details on whether it is per-CORESET or per-UE configured Boolean Default is True NR supports a mechanism to identify the spatial QCL if the offset between the time of reception of DL assignment for the PDSCH and time of reception of PDSCH is less than Threshold-Sched-Offset.

NR does not support the RRC parameter in beam management: Threshold-Sched-Offset.

FFS if such a parameter is included as a UE capability

Support the following parameter:

SRS-SpatialRelationInfo Configuration/indication of the spatial relation between a reference RS and the target SRS. Reference RS can be SSB/CSI-RS/SRS. Source: R1-1718920

Value range: {SSB, CSI-RS, SRS}

There are some agreements on beam management in RAN1 #91 meeting, as described in the Final Report of 3GPP TSG RAN WG1 Meeting #91 v1.0.0 (Reno, USA, 27 Nov.-1 Dec. 2017) as follows:

[ ... ]

Agreement:

Mechanism to indication of source QCL for a resource:

P-CSI-RS—through RRC configuration

SP-CSI-RS—configuring the resource(s) through RRC, activation/deactivation through MAC-CE;

The QCL for SP-CSI-RS is indicated in the same MAC-CE message that activates the SP-CSI-RS.

The QCL is provided through an association with one of the M candidate TCI states

AP-CSI-RS—

Through DCI (AP-CSI-report-triggering state indication)

For each AP-CSI-RS resource associated with each triggering state, QCL configuration is provided through an association with one of the M candidate TCI states by RRC Agreement:

PUCCH beam indication is introduced by RRC signalling

Introduce one RRC parameter: PUCCH-Spatial-relation-info

Information associating an SSB ID or, a CRI, or a SRI

This is per PUCCH resource configuration

Agreement:

The state Is-TCI-Present is configured on a per-CORESET basis

For beam management with beam indication, on all CORESETs configured with Is-TCI-Present=false, the TCI state used for PDCCH is reused for PDSCH reception The same set of M TCI states are reused for CORESET K TCI states are configured per CORESET When K>1, MAC CE can indicate which one TCI state to use for control channel QCL indication When K=1, no additional MAC CE signaling is necessary Agreement:

When the scheduling offset is <=k, the PDSCH uses QCL assumption that is based on a default TCI state (e.g. the first state of the 2AN states used for PDSCH QCL indication)

Agreement

Between initial RRC configuration and MAC CE activation of TCI states, the UE may assume that both PDCCH and PDSCH DMRS are spatially QCL-ed with the SSB determined during initial access Agreement:

When the scheduling offset is <=k, and the PDSCH uses QCL assumption that is based on a default TCI state The default TCI state corresponds to the TCI state used for control channel QCL indication for the lowest CORESET ID in that slot Agreement:

Modify the RRC parameter PUCCH-Spatial-relation-info as list.

Each entry can be SSB ID or, a CRI, or a SRI

One or multiple SpatialRelationInfo IE(s) is included in the list.

Introduce MAC-CE signalling to provide spatial relation information for a PUCCH resource to one of the entries in PUCCH-Spatial-relation-info If PUCCH-Spatial-relation-info includes one SpatialRelationInfo 1E, UE applies the configured SpatialRelationInfo and no MAC-CE is used.

MAC-CE Impact:

| TS38.214 | Indication of spatial relation for PUCCH | Provides the spatial relation for a PUCCH resource | PUCCH resource ID\|Bitmap of size [8] (Bitmap activates one of the [8] entries within the RRC parameter PUCCH-Spatial-relation-info) |
|---|---|---|---|

RRC modification:

| PUCCH-SpatialRelationInfo | New | PUCCH-Spatial Relation Info | List of configurations of the spatial relation between reference RS and PUCCH. Reference RS can be SSB/CSI-RS/SRS. SSB Index, NZP-CSI-RS-ResourceConfigId, or SRS-ResourceConfigId | UE-Specific | 38.331 |
|---|---|---|---|---|---|

Agreement:

A candidate set of DL RSs are configured using RRC mechanism

Each state of M TCI states is RRC configured with a downlink RS set used as a QCL reference, and MAC-CE is used to select up to 2AN TCI states out of M for PDSCH QCL indication Agreement:

Support to use RRC signalling to explicitly differentiate between SRS resources sets for beam management and SRS resource set for codebook/non-codebook based UL transmission;

For SRS resources sets for UL beam management, only one resource in each of multiple SRS sets can be transmitted at a given time instant The SRS resources in different SRS resource sets can be transmitted simultaneously There are some agreements on beam management in RAN1 #AH_1801 meeting, as described in the Final Report of 3GPP TSG RAN WG1 Meeting #AH_1801 v1.0.0 (Vancouver, Canada, 22-26 Jan. 2018) as follows:

Agreement:
Maximum number of candidate TCI states is M_max. Down-select to one of the following two alternatives:
Alt-1: M_max=64
Note that the value M_max is for configuration of TCI states only Agreement:
QCL source for a target semi-persistent CSI-RS resource set is provided by TCI states in the same MAC-CE at resource level Agreement
Spatial relationship for a target semi-persistent SRS resource set is provided by SSB-ID/SRS resource ID/CSI-RS resource ID in the same MAC-CE at resource level Agreement:
Maximum number of candidate TCI states configured for a CORESET is K_max
K_max=M
Note that the value M is for configuration of TCI states only
Note: UE is not expected to track the K configured TCI states. The value of K is for configuration of TCI states only.

There are some agreements on beam management in RAN1 #92 meeting, as described in the Draft Report of 3GPP TSG RAN WG1 Meeting #92 v0.2.0 (Athens, Greece, 26-2 Mar. 2018) as follows:

Agreement:
If all configured TCI states do NOT contain QCL Type D i.e. QCL w.r.t. spatial Rx parameter, a UE shall obtain the other QCL assumptions from the indicated TCI state for its scheduled PDSCH irrespective of the time offset between the reception of the DL DCI and the corresponding PDSCH Agreement (RRC Parameter Update):
Maximum number of spatial relations in PUCCH-SpatialRelationInfo is 8. Update to 38.331: maxNrofSpatialRelationInfos=8.

[ . . . ]

Agreement (RRC Parameter Update):
Update to 38.331: Size of list qcl-Info-aPeriodicReportingTrigger is maxNrofReportConfigIdsPerTrigger*maxNrofAP-CSI-RS-ResouresPerSet There are some agreements on beam management in RAN1 #92bis meeting, as described in the Final Report of 3GPP TSG RAN WG1 Meeting #92bis as follows:

Agreement
For the case of single CC case, to determine the "lowest CORESET-ID" for determining default spatial QCL assumption for PDSCH, only consider CORESETs in active BWP Agreement:
For PUSCH scheduled by DCI format 0_0, the UE shall use a default spatial relation corresponding to the spatial relation, if applicable, used by the PUCCH resource with the lowest ID configured in the active UL BWP
Above applies for a cell configured with PUCCH
Note: the UE is configured with a list of spatial relations in PUCCH-SpatialRelationInfo. MAC-CE indicates a single selected spatial relation from the list on a per-PUCCH resource basis if the list has more than one element.

Agreement
Support SP-SRS as mandatory with UE capability signalling

Agreement:
Support uplink cross-carrier beam indication for PUCCH and SRS
Add Cell index and BWP information in Spatia/Relation configuration 3GPP TS 38.212 (as included in 3GPP R1-1805794) provides the following description related to beam indication and DCI (Downlink Control Information) contents:

7.3.1.1 DCI Formats for Scheduling of PUSCH
7.3.1.1.1 Format 0_0

DCI format 0_0 is used for the scheduling of PUSCH in one cell.
The following information is transmitted by means of the DCI format 0_0 with CRC scrambled by C-RNTI:

Identifier for DCI formats—1 bit
The value of this bit field is always set to 0, indicating an UL DCI format Frequency domain resource assignment —$\lceil \log_2(N_{RB}^{UL,BWP}(N_{RB}^{UL,BWP}+1)/2) \rceil$ bits where
$N_{RB}^{UL,BWP}$ is the size of the active UL bandwidth part in case DCI format 0_0 is monitored in the UE specific search space and satisfying
the total number of different DCI sizes monitored per slot is no more than 4 for the cell, and
the total number of different DCI sizes with C-RNTI monitored per slot is no more than 3 for the cell
otherwise, $N_{RB}^{UL,BWP}$ is the size of the initial DL bandwidth part.

For PUSCH hopping with resource allocation type 1:
$N_{UL\_hop}$ MSB bits are used to indicate the frequency offset according to Subclause 6.3 of [6, TS 38.214], where $N_{UL\_hop}$=1 if the higher layer parameter frequencyHoppingOffsetLists contains two offset values and $N_{UL\_hop}$=2 if the higher layer parameter frequencyHoppingOffsetLists contains four offset values
$\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]

For non-PUSCH hopping with resource allocation type 1:
$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]

Time domain resource assignment—4 bits as defined in Subclause 6.1.2.1 of [6, TS 38.214]
Frequency hopping flag—1 bit.
Modulation and coding scheme—5 bits as defined in Subclause 6.1.3 of [6, TS 38.214]
New data indicator—1 bit
Redundancy version—2 bits as defined in Table 7.3.1.1.1-2
HARQ process number—4 bits
TPC command for scheduled PUSCH—2 bits as defined in Subclause 7.1.1 of [5, TS 38.213]
UL/SUL indicator—1 bit for UEs configured with SUL in the cell as defined in Table 7.3.1.1.1-1 and the number of bits for DCI format 1_0 before padding is larger than the number of bits for DCI format 0_0 before padding;

0 bit otherwise. The UL/SUL indicator, if present, locates in the last bit position of DCI format 0_0, after the padding bit(s).

If the UL/SUL indicator is present in DCI format 0_0 and the higher layer parameter pusch-Config is not configured on both UL and SUL, the UE ignores the UL/SUL indicator field in DCI format 0_0, and the corresponding PUSCH scheduled by the DCI format 0_0 is for the UL or SUL for which high layer parameter pucch-Config is configured;

If the UL/SUL indicator is not present in DCI format 0_0, the corresponding PUSCH scheduled by the DCI format 0_0 is for the UL or SUL for which high layer parameter pucch-Config is configured.

The following information is transmitted by means of the DCI format 0_0 with CRC scrambled by TC-RNTI:

Identifier for DCI formats—1 bit
   The value of this bit field is always set to 0, indicating an UL DCI format Frequency domain resource assignment —$\lceil \log_2(N_{RB}^{UL,BWP}(N_{RB}^{UL,BWP}+1)/2) \rceil$ bits where
   $N_{RB}^{UL,BWP}$ is the size of the active UL bandwidth part in case DCI format 0_0 is monitored in the UE specific search space and satisfying
       the total number of different DCI sizes monitored per slot is no more than 4 for the cell, and
       the total number of different DCI sizes with C-RNTI monitored per slot is no more than 3 for the cell
   otherwise, $N_{RB}^{UL,BWP}$ is the size of the initial DL bandwidth part.

For PUSCH hopping with resource allocation type 1:
       $N_{UL\_hop}$ MSB bits are used to indicate the frequency offset according to Subclause 6.3 of [6, TS 38.214], where $N_{UL\_hop}=1$ if $N_{RB}^{UL,BWP}<50$ and $N_{UL\_hop}=2$ otherwise
       $\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
   For non-PUSCH hopping with resource allocation type 1:
       $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]

Time domain resource assignment—4 bits as defined in Subclause 6.1.2.1 of [6, TS 38.214]
Frequency hopping flag—1 bit.
Modulation and coding scheme—5 bits as defined in Subclause 6.1.3 of [6, TS 38.214], using Table 5.1.3.1-1
New data indicator—1 bit, reserved
Redundancy version—2 bits as defined in Table 7.3.1.1.1-2
HARQ process number—4 bits, reserved
TPC command for scheduled PUSCH—2 bits as defined in Subclause 7.1.1 of [5, TS 38.213]
UL/SUL indicator—1 bit if the cell has two ULs and the number of bits for DCI format 1_0 before padding is larger than the number of bits for DCI format 0_0 before padding; 0 bit otherwise.
   If 1 bit, reserved, and the corresponding PUSCH is always on the same UL carrier as the previous transmission of the same TB The following information is transmitted by means of the DCI format 0_0 with CRC scrambled by CS-RNTI:
XXX—x bit If DCI format 0_0 is monitored in common search space and if the number of information bits in the DCI format 0_0 prior to padding is less than the payload size of the DCI format 1_0 monitored in common search space for scheduling the same serving cell, zeros shall be appended to the DCI format 0_0 until the payload size equals that of the DCI format 1_0.

If DCI format 0_0 is monitored in common search space and if the number of information bits in the DCI format 0_0 prior to padding is larger than the payload size of the DCI format 1_0 monitored in common search space for scheduling the same serving cell, the bitwidth of the frequency domain resource allocation field in the DCI format 0_0 is reduced such that the size of DCI format 0_0 equals to the size of the DCI format 1_0.

[Table 7.3.1.1.1-1 of 3GPP TS 38.212, entitled "UL/SUL indicator", is reproduced as FIG. 5]

[Table 7.3.1.1.1-2 of 3GPP TS 38.212, entitled "Redundancy version", is reproduced as FIG. 6]

7.3.1.1.2 Format 0_1

DCI format 0_1 is used for the scheduling of PUSCH in one cell.

The following information is transmitted by means of the DCI format 0_1 with CRC scrambled by C-RNTI:

Identifier for DCI formats—1 bit
   The value of this bit field is always set to 0, indicating an UL DCI format
Carrier indicator—0 or 3 bits, as defined in Subclause x.x of [5, TS38.213].
UL/SUL indicator—0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1.
Bandwidth part indicator—0, 1 or 2 bits as determined by the number of UL BWPs $n_{BWP,RRC}$ configured by higher layers. The bitwidth for this field is determined as $\lceil \log_2(n_{BWP}) \rceil$ bits, where
   $n_{BWP}=n_{BWP,RRC}+1$ if $n_{BWP,RRC} \leq 3$, in which case the bandwidth part indicator is equivalent to the higher layer parameter BWP-Id;
   $n_{BWP}=n_{BWP,RRC}$, in which case the bandwidth part indicator is defined in Table 7.3.1.1.2-1-.
Frequency domain resource assignment—number of bits determined by the following, where $N_{RB}^{UL,BWP}$ is the size of the active UL bandwidth part:
   $N_{RBG}$ bits if only resource allocation type 0 is configured, where $N_{RBG}$ is defined in Subclause 6.1.2.2.1 of [6, TS 38.214],
   $\lceil \log_2(N_{RB}^{UL,BWP}(N_{RB}^{UL,BWP}+1)/2) \rceil$ bits if only resource allocation type 1 is configured, or max $(\lceil \log_2(N_{RB}^{UL,BWP}(N_{RB}^{UL,BWP}+1)/2) \rceil, N_{RBG})+1$ bits if both resource allocation type 0 and 1 are configured.
   If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
   For resource allocation type 0, the $N_{RBG}$ LSBs provide the resource allocation as defined in Subclause 6.1.2.2.1 of [6, TS 38.214].
   For resource allocation type 1, the $\lceil \log_2(N_{RB}^{UL,BWP}(N_{RB}^{UL,BWP}+1)/2) \rceil$ LSBs provide the resource allocation as follows:
       For PUSCH hopping with resource allocation type 1:
           $N_{UL\_hop}$ MSB bits are used to indicate the frequency offset according to Subclause 6.3 of [6, TS 38.214], where $N_{UL\_hop}=1$ if the higher layer parameter frequencyHoppingOffsetLists contains two offset values and $N_{UL\_hop}$=2 if the higher layer parameter frequencyHoppingOffsetLists contains four offset values $\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]

For non-PUSCH hopping with resource allocation type 1:

$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]

Time domain resource assignment—0, 1, 2, 3, or 4 bits as defined in Subclause 6.1.2.1 of [6, TS38.214]. The bitwidth for this field is determined as $\lceil \log_2(I) \rceil$ bits, where I the number of entries in the higher layer parameter pusch-AllocationList.

Frequency hopping flag—0 or 1 bit:
   0 bit if only resource allocation type 0 is configured;
   1 bit according to Table 7.3.1.1.2-34 otherwise, only applicable to resource allocation type 1, as defined in Subclause 6.3 of [6, TS 38.214].

Modulation and coding scheme—5 bits as defined in Subclause 6.1.4.1 of [6, TS 38.214]

New data indicator—1 bit

Redundancy version—2 bits as defined in Table 7.3.1.1.1-2

HARQ process number—4 bits

1st downlink assignment index—1 or 2 bits:
   1 bit for semi-static HARQ-ACK codebook;
   2 bits for dynamic HARQ-ACK codebook with single HARQ-ACK codebook.

2nd downlink assignment index—0 or 2 bits:
   2 bits for dynamic HARQ-ACK codebook with two HARQ-ACK sub-codebooks;
   0 bit otherwise.

TPC command for scheduled PUSCH—2 bits as defined in Subclause 7.1.1 of [5, TS38.213]

$$SRS \text{ resource indicator} - \left\lceil \log_2\left( \sum_{k=1}^{\min\{L_{max}, N_{SRS}\}} \binom{N_{SRS}}{k} \right) \right\rceil$$

or $\lceil \log_2(N_{SRS}) \rceil$ bits, where $N_{SRS}$ is the number of configured SRS resources in the SRS resource set associated with the higher layer parameter usage of value 'codebook' or 'nonCodebook', and $L_{max}$ is the maximum number of supported layers for the PUSCH.

$$\left\lceil \log_2\left( \sum_{k=1}^{\min\{L_{max}, N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set associated with the higher layer parameter usage of value 'nonCodebook';

$\lceil \log_2(N_{SRS}) \rceil$ bits according to Tables 7.3.1.1.2-32 if the higher layer parameter txConfig=codebook, where $N_{SRS}$ is the number of configured SRS resources in the SRS resource set associated with the higher layer parameter usage of value 'codebook'.

Precoding information and number of layers—number of bits determined by the following:
   0 bits if the higher layer parameter txConfig=nonCodebook;
   0 bits for 1 antenna port and if the higher layer parameter txConfig=codebook;
   4, 5, or 6 bits according to Table 7.3.1.1.2-2 for 4 antenna ports, if txConfig=codebook, and according to the values of higher layer parameters transformPrecoder, maxRank, and codebookSubset;
   2, 4, or 5 bits according to Table 7.3.1.1.2-3 for 4 antenna ports, if txConfig=codebook, and according to the values of higher layer parameters transformPrecoder, maxRank, and codebookSubset;
   2 or 4 bits according to Table 7.3.1.1.2-4 for 2 antenna ports, if txConfig=codebook, and according to the values of higher layer parameters maxRank and codebookSubset;
   1 or 3 bits according to Table 7.3.1.1.2-5 for 2 antenna ports, if txConfig=codebook, and according to the values of higher layer parameters maxRank and codebookSubset.

Antenna ports—number of bits determined by the following
   2 bits as defined by Tables 7.3.1.1.2-6, if transformPrecoder=enabled, dmrs-Type=1, and maxLength=1;
   4 bits as defined by Tables 7.3.1.1.2-7, if transformPrecoder=enabled, dmrs-Type=1, and maxLength=2;
   3 bits as defined by Tables 7.3.1.1.2-8/9/10/11, if transformPrecoder=disabled, dmrs-Type=1, and maxLength=1, and the value of rank is determined according to the SRS resource indicator field if the higher layer parameter txConfig=nonCodebook and according to the Precoding information and number of layers field if the higher layer parameter txConfig=codebook;
   4 bits as defined by Tables 7.3.1.1.2-12/13/14/15, if transformPrecoder=disabled, dmrs-Type=1, and maxLength=2, and the value of rank is determined according to the SRS resource indicator field if the higher layer parameter txConfig=nonCodebook and according to the Precoding information and number of layers field if the higher layer parameter txConfig=codebook;
   4 bits as defined by Tables 7.3.1.1.2-16/17/18/19, if transformPrecoder=disabled, dmrs-Type=2, and maxLength=1, and the value of rank is determined according to the SRS resource indicator field if the higher layer parameter txConfig=nonCodebook and according to the Precoding information and number of layers field if the higher layer parameter txConfig=codebook;
   5 bits as defined by Tables 7.3.1.1.2-20/21/22/23, if transformPrecoder=disabled, dmrs-Type=2, and maxLength=2, and the value of rank is determined according to the SRS resource indicator field if the higher layer parameter txConfig=nonCodebook and according to the Precoding information and number of layers field if the higher layer parameter txConfig=codebook.

where the number of CDM groups without data of values 1, 2, and 3 in Tables 7.3.1.1.2-6 to 7.3.1.1.2-23 refers to CDM groups {0}, {0,1}, and {0, 1,2} respectively.

SRS request—2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

CSI request—0, 1, 2, 3, 4, 5, or 6 bits determined by higher layer parameter reportTriggerSize.

CBG transmission information (CBGTI)—0, 2, 4, 6, or 8 bits determined by higher layer parameter maxCode-BlockGroupsPerTransportBlock for PUSCH.

PTRS-DMRS association—number of bits determined as follows
  0 bit if PTRS-UplinkConfig is not configured and transformPrecoder=disabled, or if transformPrecoder=enabled, or if maxRank=1;
  2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.

beta_offset indicator—0 if the higher layer parameter betaOffsets=semiStatic; otherwise 2 bits as defined by Table 9.3-3 in [5, TS 38.213].

DMRS sequence initialization—0 if the higher layer parameter transformPrecoder=enabled or 1 bit if the higher layer parameter transformPrecoder=disabled for $n_{SCID}$ selection defined in Subclause 7.4.1.1.1 of [4, TS 38.211].

The following information is transmitted by means of the DCI format 0_1 with CRC scrambled by CS-RNTI:
  XXX—x bit The following information is transmitted by means of the DCI format 0_1 with CRC scrambled by SP-CSI-RNTI:
  XXX—x bit For a UE configured with SUL in a cell, if PUSCH is configured to be transmitted on both the SUL and the non-SUL of the cell and if the number of information bits in format 0_1 for the SUL is not equal to the number of information bits in format 0_1 for the non-SUL, zeros shall be appended to smaller format 0_1 until the payload size equals that of the larger format 0_1.

[Table 7.3.1.1.2-1 of 3GPP TS 38.212, entitled "Bandwidth part indicator", is reproduced as FIG. 7]

[Table 7.3.1.1.2-24 of 3GPP TS 38.212, entitled "SRS request", is reproduced as FIG. 8]

[Table 7.3.1.1.2-28 of 3GPP TS 38.212, entitled "SRI indication for non-codebook based PUSCH transmission, $L_{max}=1$", is reproduced as FIG. 9]

[Table 7.3.1.1.2-29 of 3GPP TS 38.212, entitled "SRI indication for non-codebook based PUSCH transmission, $L_{max}=2$", is reproduced as FIG. 10]

[Table 7.3.1.1.2-30 of 3GPP TS 38.212, entitled "SRI indication for non-codebook based PUSCH transmission, $L_{max}=3$", is reproduced as FIG. 11]

[Table 7.3.1.1.2-31 of 3GPP TS 38.212, entitled "SRI indication for non-codebook based PUSCH transmission, $L_{max}=4$", is reproduced as FIG. 12]

[Table 7.3.1.1.2-32 of 3GPP TS 38.212, entitled "SRI indication for codebook based PUSCH transmission", is reproduced as FIG. 13]

[Table 7.3.1.1.2-33 of 3GPP TS 38.212, entitled "VRB-to-PRB mapping", is reproduced as FIG. 14]

[Table 7.3.1.1.2-34 of 3GPP TS 38.212, entitled "Frequency hopping indication", is reproduced as FIG. 15]

3GPP TS 38.213 (as included in 3GPP R1-1805795) provides the following description related to beam indication, UL control, and DL control:

9.2.1 PUCCH Resource Sets does not have dedicated PUCCH resource configuration, provided by higher layer parameter PUCCH-ResourceSet in PUCCH-Config, a PUCCH resource set is provided by higher layer parameter pucch-ResourceCommon in SystemInformationBlockType1 through an index to a row of Table 9.2.1-1 for transmission of HARQ-ACK information on PUCCH in an initial active UL BWP provided by SystemInformationBlockType1. The PUCCH resource set is provided by higher layer parameter PUCCH-Resource-Common and includes sixteen resources, each corresponding to a PUCCH format, a first symbol, a duration, a PRB offset, and a cyclic shift index set for a PUCCH transmission. The UE transmits a PUCCH using frequency hopping. The UE transmits the PUCCH using the same spatial domain transmission filter as for the Msg3 PUSCH transmission. The UE is not expected to generate more than one HARQ-ACK information bit. The UE is provided sixteen PUCCH resources by higher layer parameter PUCCH-Resource-Common.

a UE has dedicated PUCCH resource configuration, the UE is provided by higher layers with one or more PUCCH resources.—

A PUCCH resource includes the following parameters:
  a PUCCH resource index provided by higher layer parameter pucch-ResourceId
  an index of the first PRB prior to frequency hopping or for no frequency hopping by higher layer parameter startingPRB
  an index of the first PRB after frequency hopping by higher layer parameter secondHopPRB;
  an indication for intra-slot frequency hopping by higher layer parameter intraSlotFrequencyHopping
  a configuration for a PUCCH format, from PUCCH format 0 through PUCCH format 4, provided by higher layer parameter format A UE can be configured up to four sets of PUCCH resources by higher layer parameter PUCCH-ResourceSet. A PUCCH resource set is associated with a PUCCH resource set index provided by higher layer parameter pucch-ResourceSetId, with a set of PUCCH resource indexes provided by higher layer parameter resourceList that provides a set of pucch-ResourceId used in the PUCCH resource set, and with a maximum number of UCI information bits the UE can transmit using the PUCCH resource set provided by higher layer parameter maxPayloadMinus1.

The maximum number of PUCCH resources in the first PUCCH resource set is 32 and the maximum number of PUCCH resources in the other sets of PUCCH resources is 8.

10 UE Procedure for Receiving Control Information

If the UE is configured with a SCG, the UE shall apply the procedures described in this clause for both MCG and SCG
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE monitors a set of PDCCH candidates in one or more control resource sets on the active DL BWP on each activated serving cell according to corresponding search space sets where monitoring implies decoding each PDCCH candidate according to the monitored DCI formats.

A UE can be configured by higher layer parameter ssb-periodicityServingCell a periodicity of half frames for reception of SS/PBCH blocks in a serving cell.

For monitoring of a PDCCH candidate

If the UE has received ssb-PositionsInBurst in SystemInformationBlockType1 and has not received ssb-PositionsInBurst in ServingCellConfigCommon for a serving cell and if at least one RE for monitoring a PDCCH candidate for a DCI format with CRC not scrambled by SI-RNTI on the serving cell overlaps with respective at least one RE corresponding to a SS/PBCH block index provided by ssb-PositionsInBurst in SystemInformationBlockType1, the UE is not required to monitor the PDCCH candidate.

If a UE has received ssb-PositionsInBurst in ServingCellConfigCommon for a serving cell and if at least one RE for monitoring a PDCCH candidate for a DCI format with CRC not scrambled by SI-RNTI on the serving cell overlaps with respective at least one RE corresponding to a SS/PBCH block index provided by ssb-PositionsInBurst in ServingCellConfigCommon, the UE is not required to monitor the PDCCH candidate.

If the has not received both ssb-PositionsInBurst in SystemInformationBlockType1 and ssb-PositionsInBurst in ServingCellConfigCommon for a serving cell and if the UE monitors the PDCCH candidate for a Type0-PDCCH common search space on the serving cell according to the procedure described in Subclause 13, the UE may assume that no SS/PBCH block is transmitted in REs used for monitoring the PDCCH candidate on the serving cell.

If a carrier aggregation capability for a UE, as included in UE-NR-Capability, is larger than 4, the UE includes in UE-NR-Capability an indication for a maximum number of PDCCH candidates the UE can monitor per slot when the UE is configured for carrier aggregation operation over more than 4 cells. When the UE is configured for carrier aggregation operation over more than 4 cells, the UE is not expected to be configured with a number of PDCCH candidates to monitor per slot that is larger than the maximum number.

10.1 UE Procedure for Determining Physical Downlink Control Channel Assignment each DL BWP configured to a UE in a serving cell, a UE can be provided by higher layer signalling with P≤3 control resource sets. For each control resource set, the UE is provided the following by higher layer parameter Contro/ResourceSet:

a control resource set index p, 0≤p<12, by higher layer parameter controlResourceSetId;

a DM-RS scrambling sequence initialization value by higher layer parameter pdcch-DMRS-ScramblingID;

a precoder granularity for a number of REGs in the frequency domain where the UE can assume use of a same DM-RS precoder by higher layer parameter precoderGranularity;

a number of consecutive symbols provided by higher layer parameter duration;

a set of resource blocks provided by higher layer parameter frequencyDomainResources;

CCE-to-REG mapping parameters provided by higher layer parameter cce-REG-MappingType;

an antenna port quasi co-location, from a set of antenna port quasi co-locations provided by higher layer parameter TCI-StatesPDCCH, indicating quasi co-location information of the DM-RS antenna port for PDCCH reception;

an indication for a presence or absence of a transmission configuration indication (TCI) field for DCI format 1_0 or DCI format 1_1 transmitted by a PDCCH in control resource set p, by higher layer parameter TCI-PresentInDCI.

If a UE has received initial configuration of more than one TCI states by higher layer parameter TCI-StatesPDCCH containing more than one TCI states but has not received a MAC CE activation command for one of the TCI states, the UE assumes that the DM-RS antenna port associated with PDCCH reception is quasi co-located with the SS/PBCH block the UE identified during the initial access procedure with respect to delay spread, Doppler spread, Doppler shift, average delay, and spatial Rx parameters, when applicable. If the UE has received a MAC CE activation command for one of the TCI states, the UE applies the activation command 3 msec after a slot where the UE transmits HARQ-ACK information for the PDSCH providing the activation command.

If a UE has received higher layer parameter TCI-StatesPDCCH containing a single TCI state, the UE assumes that the DM-RS antenna port associated with PDCCH reception is quasi co-located with the one or more DL RS configured by the TCI state.

3GPP TS 38.214 (as included in 3GPP R1-1805796) provides the following description related to beam indication, QCL (Quasi-colocation), Physical Downlink Shared Channel (PDSCH), and Physical Uplink Shared Channel (PUSCH):

5.1.5 Antenna Ports Quasi Co-Location

The UE can be configured with a list of up to M TCI-State configurations within higher layer parameter PDSCH-Config to decode PDSCH according to a detected PDCCH with DCI intended for the UE and the given serving cell, where M depends on the UE capability. Each configured TCI state includes one RS set TCI-RS-SetConfig. Each TCI-State contains parameters for configuring a quasi co-location relationship between one or two downlink reference signals and the DM-RS port group of the PDSCH. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location type corresponding to each DL RS given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

The UE receives an activation command [10, TS 38.321] used to map up to 8 TCI states to the codepoints of the DCI field 'Transmission Configuration Indication'. When the HARQ-ACK corresponding to the PDSCH carrying the activation command is transmitted in slot n, the indicated mapping between TCI states and codepoints of the DCI field 'Transmission Configuration Indication' should be applied starting from slot $n+3N_{slot}^{subframe,\mu}$. After a UE receives [initial] higher layer configuration of TCI states and before reception of the activation command, the UE may assume that the antenna ports of one DM-RS port group of PDSCH of a serving cell are spatially quasi co-located with the SSB determined in the initial access procedure with respect to Doppler shift, Doppler spread, average delay, delay spread, spatial Rx parameters, where applicable.

If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If tci-PresentInDCI is set as 'disabled' for the CORESET scheduling the PDSCH or the PDSCH is scheduled by a DCI format 1_0, for determining PDSCH antenna port quasi co-location, the UE assumes that the TCI state for the PDSCH is identical to the TCI state applied for the CORESET used for the PDCCH transmission.

If the tci-PresentInDCI is set as 'enabled', when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the antenna ports of one DM-RS port group of PDSCH of a serving cell are quasi co-located with the RS(s) in the RS set with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability [12, TS 38.331]. For both the cases when tci-PresentInDCI='enabled' and tci-PresentInDCI='disabled', if the offset between the reception of the DL DCI and the corresponding PDSCH is less than the threshold Threshold-Sched-Offset, the UE may assume that the antenna ports of one DM-RS port group of PDSCH of a serving cell are quasi co-located based on the TCI state used for PDCCH quasi co-location indication of the lowest CORESET-ID in the latest slot in which one or more CORESETs within the active BWP of the serving cell are configured for the UE. If all configured TCI states do not contain 'QCL-TypeD', the UE shall obtain the other QCL assumptions from the indicated TCI states for its scheduled PDSCH irrespective of the time offset between the reception of the DL DCI and the corresponding PDSCH.

A UE should expect only the following qcl-Type configurations in the higher layer parameter TCI-State:
  If a CSI-RS resource is in a NZP-CSI-RS-ResourceSet configured with higher layer parameter trs-Info, the UE should only expect
    'QCL-TypeC' or {QCL-TypeC' and QCL-TypeD'} configurations with SS/PBCH block, or
    'QCL-TypeD' with a CSI-RS resource in a NZP-CSI-RS-ResourceSet configured with higher layer parameter repetition.
  If a CSI-RS resource is in a NZP-CSI-RS-ResourceSet configured without higher layer parameter trs-Info and without repetition, the UE should only expect
    'QCL-TypeA' or 'QCL-TypeB' configuration with a CSI-RS resource in a NZP-CSI-RS-ResourceSet configured with higher layer parameter trs-Info or
    'QCL-TypeD' with a CSI-RS resource in a NZP-CSI-RS-ResourceSet configured with higher layer parameter repetition.
  If a CSI-RS resource in a NZP-CSI-RS-ResourceSet is configured with higher layer parameter repetition, the UE should only expect
    'QCL-TypeA' configuration with CSI-RS in a NZP-CSI-RS-ResourceSet configured with higher layer parameter trs-Info, or
    {'QCL-TypeC' and 'QCL-TypeD'} configurations with SS/PBCH block, or
    'QCL-TypeD' with a CSI-RS resource in a NZP-CSI-RS-ResourceSet configured with higher layer parameter repetition.
  For the DM-RS of CORESET scheduling the PDSCH, the UE should only expect
    'QCL-TypeA' configuration with a CSI-RS resource in a NZP-CSI-RS-ResourceSet configured with higher layer parameter trs-Info, or
    {'QCL-TypeA' and 'QCL-TypeD'} configuration with SS/PBCH block if UE is not configured with CSI-RS in a NZP-CSI-RS-ResourceSet configured with higher layer parameter trs-Info, or
    'QCL-TypeD' with a CSI-RS resource in a NZP-CSI-RS-ResourceSet configured with higher layer parameter repetition.
  For the DM-RS of PDSCH, the UE should only expect
    'QCL-TypeA' configuration with a CSI-RS resource in a NZP-CSI-RS-ResourceSet configured without higher layer parameter trs-Info and without repetition, or
    'QCL-TypeA' configuration with a CSI-RS resource in a NZP-CSI-RS-ResourceSet configured with higher layer parameter trs-Info, or
    {QCL-TypeA' and QCL-TypeD'} configuration with SS/PBCH block if UE is not configured with a CSI-RS resource in a NZP-CSI-RS-ResourceSet with higher layer parameter trs-Info or QCL-TypeD' with a CSI-RS resource in a NZP-CSI-RS-ResourceSet configured with higher layer parameter repetition, or
    {QCL-TypeA' and QCL-TypeD'} configuration with CSI-RS resource in a NZP-CSI-RS-ResourceSet configured without higher layer parameter trs-Info and without repetition.

6 Physical Uplink Shared Channel Related Procedure

If a UE is configured by higher layers to decode PDCCH with the CRC scrambled by the C-RNTI, the UE shall decode the PDCCH and transmit the corresponding PUSCH.

6.1 UE Procedure for Transmitting the Physical Uplink Shared Channel

PUSCH transmission(s) can be dynamically scheduled by an UL grant in a DCI, or semi-statically configured to operate according to Subclause 6.1.2.3 and according to Subclause 5.8.2 of [10, TS 38.321] upon the reception of higher layer parameter of configuredGrantConfig including rrc-ConfiguredUplinkGrant without the detection of an UL grant in a DCI, or configurdGrantConfig not including rrc-ConfiguredUplinkGrant semi-persistently scheduled by an UL grant in a DCI after the reception of higher layer parameter configurdGrantConfig not including rrc-ConfiguredUplinkGrant.

For PUSCH scheduled by DCI format 0_0 on a cell, the UE shall transmit PUSCH according to the spatial relation, if applicable, corresponding to the PUCCH resource, as described in sub-clause 9.2.1 of [6, TS 38.213], with the lowest ID within the active UL BWP of the cell.

16 HARQ processes per cell is supported by the UE.

6.1.1 Transmission Schemes

Two transmission schemes are supported for PUSCH: codebook based transmission and non-codebook based transmission. The UE is configured with codebook based transmission when the higher layer parameter txConfig in PUSCH-Config is set to 'codebook', the UE is configured non-codebook based transmission when the higher layer parameter txConfig is set to 'nonCodebook'. If the higher layer parameter txConfig is not configured, the PUSCH transmission is based on one PUSCH antenna port, which is triggered by DCI format 0_0.

6.1.1.1 Codebook Based UL Transmission

For codebook based transmission, the UE determines its PUSCH transmission precoder based on SRI, TPMI and the transmission rank from the DCI, given by DCI fields of SRS resource indicator and Precoding information and number of layers in subclause 7.3.1.1.2 of [TS 38.212], where the TPMI is used to indicate the precoder to be applied over the antenna ports {0 . . . v−1} and that corresponds to the SRS resource selected by the SRI when multiple SRS resources are configured, or if a single SRS resource is configured TPMI is used to indicate the precoder to be applied over the antenna ports {0 . . . v−1} that correspond to the SRS resource. The transmission precoder is selected from the uplink codebook that has a number of antenna ports equal to higher layer parameter nrofSRS-Ports in SRS-Config, as defined in Subclause 6.3.1.5 of [4, TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI before slot n.

For codebook based transmission, the UE may be configured with a single SRS resource set and only one SRS resource can be indicated based on the SRI from within the SRS resource set. The maximum number of configured SRS resources for codebook based transmission is 2. If AP-SRS is configured for a UE, the SRS request field in DCI triggers the transmission of AP-SRS resources.

6.1.1.2 Non-Codebook Based UL Transmission

For non-codebook based transmission, the UE can determine its PUSCH precoder and transmission rank based on the wideband SRI given by SRS resource indicator field from the DCI. The UE shall use one or multiple SRS resources for SRS transmission, where the number of SRS resources which can be configured to the UE for simultaneously transmission in the same RBs is a UE capability. Only one SRS port for each SRS resource is configured. Only one SRS resource set can be configured with higher layer parameter usage in SRS-Config set to 'nonCodebook'. The maximum number of SRS resources that can be configured for non-codebook based uplink transmission is 4. The indicated SRI in slot n is associated with the most recent transmission of SRS resource identified by the SRI, where the SRS resource is prior to the PDCCH carrying the SRI before slot n.

For non-codebook based transmission, the UE can calculate the precoder used for the transmission of precoded SRS based on measurement of an associated NZP CSI-RS resource. A UE can be configured with only one NZP CSI-RS resource for the SRS resource set.

If aperiodic SRS resource is configured, the [CSI-RS information in the same slot TBD] UL channel measurement is indicated via DCI, where the association among aperiodic SRS triggering state, triggered SRS resource(s) srs-ResourceSetId, NZP-CSI-RS-ResourceId, csi-RS are higher layer configured by AperiodicSRS-ResourceTrigger in SRS-Config. A UE may receive the dynamic SRS transmission request for aperiodic SRS transmission in the same slot as the reception of the DL CSI-RS resource A UE is not expected to update the SRS precoding information if the gap from the last symbol of the reception of the AP-CSI-RS resource and the first symbol of the AP-SRS transmission is less than 42 OFDM symbols.

If periodic or semi-persistent SRS resource set is configured, the NZP-CSI-RS-ResourceConfigID for measurement is indicated via higher layer parameter associatedCSI-RS in SRS-Config per set.

The UE shall perform one-to-one mapping from the indicated SRI(s) to the indicated DM-RS ports(s) in the DCI format 0_1 increasing order.

For non-codebook based transmission, the UE does not expect to be configured with both spatialRelationInfo for SRS resource and associatedCSI-RS in SRS-Config for SRS resource set.

For non-codebook based transmission, the UE can be scheduled with DCI format 0_1 when at least one SRS resource is configured.

6.2.1 UE Sounding Procedure

The UE can be configured with one or more Sounding Reference Symbol (SRS) resource sets as configured by the higher layer parameter SRS-ResourceSet. For each SRS resource set, a UE may be configured with K≥1SRS resources (higher later parameter SRS-Resource), where the maximum value of K is indicated by [SRS capability [13, 38.306]]. The SRS resource set applicability is configured by the higher layer parameter SRS-SetUse. When the higher layer parameter SRS-SetUse is set to 'BeamManagement', only one SRS resource in each of multiple SRS sets can be transmitted at a given time instant. The SRS resources in different SRS resource sets can be transmitted simultaneously.

For aperiodic SRS at least one state of the DCI field is used to select at least one out of the configured SRS resource set. The following SRS parameters are semi-statically configurable by higher layer parameter SRS-Resource.

- srs-ResourceId determines SRS resource configuration identify.
- Number of SRS ports as defined by the higher layer parameter nrofSRS-Ports and described in Subclause 6.4.1.4 of [4, TS 38.211].
- Time domain behaviour of SRS resource configuration as indicated by the higher layer parameter SRS-resource-Type, which can be periodic, semi-persistent, aperiodic SRS transmission as defined in Subclause 6.4.1.4 of [4, TS 38.211].
- Slot level periodicity and slot level offset as defined by the higher layer parameters periodicityAndOffset-p or periodicityAndOffset-sp for an SRS resource of type periodic or semi-persistent. The slot level offset is also defined for an aperiodic SRS resource set by the higher layer parameter slotOffset in SRS-ResourceSet.
- Number of OFDM symbols in the SRS resource, starting OFDM symbol of the SRS resource within a slot including repetition factor R as defined by the higher layer parameter resourceMapping and described in Subclause 6.4.1.4 of [4, TS 38.211].
- SRS bandwidth $B_{SRS}$ and $C_{SRS}$, as defined by the higher layer parameter freqHopping and described in Subclause 6.4.1.4 of [4, TS 38.211].
- Frequency hopping bandwidth, $b_{hop}$, as defined by the higher layer parameter freqHopping and described in Subclause 6.4.1.4 of [4, TS 38.211].
- Defining frequency domain position and configurable shift to align SRS allocation to 4 PRB grid, as defined by the higher layer parameters freqDomainPosition and freqDomainShift, respectively, and described in Subclause 6.4.1.4 of [4, TS 38.211].

Cyclic shift, as defined by the higher layer parameter cyclicShift-n2 or cyclicShift-n4 for transmission comb value 2 and 4, respectively, and described in Subclause 6.4.1.4 of [4, TS 38.211].

Transmission comb value as defined by the higher layer parameter transmissionComb described in Subclause 6.4.1.4 of [4, TS 38.211].

Transmission comb offset as defined by the higher layer parameter combOffset-n2 or combOffset-n4 for transmission comb value 2 or 4, respectively, and described in Subclause 6.4.1.4 of [4, TS 38.211].

SRS sequence ID as defined by the higher layer parameter sequenceId in Subclause 6.4.1.4 of [4].

The configuration of the spatial relation between a reference RS and the target SRS, where the higher layer parameter spatialRelationInfo, if configured, contains the ID of the reference RS. The reference RS can be an SS/PBCH block, CSI-RS or an SRS configured on the same or different component carrier and/or bandwidth part as the target SRS.

For a UE configured with one or more SRS resource configuration(s), and when the higher layer parameter resourceType in SRS-Resource is set to 'periodic':

if the UE is configured with the higher layer parameter spatialRelationInfo containing the ID of a reference 'ssb-Index', the UE shall transmit the target SRS resource with the same spatial domain transmission filter used for the reception of the reference SS/PBCH block, if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, if the higher layer parameter spatialRelationInfo containing the ID of a reference 'srs', the UE shall transmit the target SRS resource with the same spatial domain transmission filter used for the transmission of the reference periodic SRS.

For a UE configured with one or more SRS resource configuration(s), and when the higher layer parameter resourceType in SRS-Resource is set to 'semi-persistent':

when a UE receives an activation command [10, TS 38.321] for an SRS resource, and when the HARQ-ACK corresponding to the PDSCH carrying the selection command is transmitted in slot n, the corresponding actions in [10, TS 38.321] and the UE assumptions on SRS transmission corresponding to the configured SRS resource set shall be applied no earlier than slot $n+3N_{slot}^{subframe,\mu}$. The activation command also contains spatial relation assumptions provided by a list of references to reference signal IDs, one per element of the activated SRS resource set. Each ID in the list refers to a reference SS/PBCH block, NZP CSI-RS resource, or SRS resource configured on the same or different component carrier and/or bandwidth part as the SRS resource(s) in the SRS resource set.

an SRS resource in the activated resource set is configured with the higher layer parameter spatialRelationInfo, the UE shall assume that the ID of the reference signal in the activation command overrides the one configured in spatialRelationInfo.

when a UE receives a deactivation command [10, TS 38.321] for an activated SRS resource set, and when the HARQ-ACK corresponding to the PDSCH carrying the selection command is transmitted in slot n, the corresponding actions in [10, TS 38.321] and UE assumption on cessation of SRS transmission corresponding to the deactivated SRS resource set shall apply no earlier than slot $n+3N_{slot}^{subframe,\mu}$.

if the UE is configured with the higher layer parameter spatialRelationInfo containing the ID of a reference 'ssb-Index', the UE shall transmit the target SRS resource with the same spatial domain transmission filter used for the reception of the reference SS/PBCH block, if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, if the higher layer parameter spatialRelationInfo contains the ID of a reference 'srs', the UE shall transmit the target SRS resource with the same spatial domain transmission filter used for the transmission of the reference periodic SRS or of the reference semi-persistent SRS.

For a UE configured with one or more SRS resource configuration(s), and when the higher layer parameter resourceType in SRS-Resource is set to 'aperiodic':

the UE receives a configuration of SRS resource sets, the UE receives a downlink DCI, a group common DCI, or an uplink DCI based command where a codepoint of the DCI may trigger one or more SRS resource set(s).

if the UE is configured with the higher layer parameter spatialRelationInfo containing the ID of a reference 'ssb-Index', the UE shall transmit the target SRS resource with the same spatial domain transmission filter used for the reception of the reference SS/PBCH block, if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, or of the reference aperiodic CSI-RS. If the higher layer parameter spatialRelationInfo contains the ID of a reference 'srs', the UE shall transmit the target SRS resource with the same spatial domain transmission filter used for the transmission of the reference periodic SRS or of the reference semi-persistent SRS or of the reference aperiodic SRS.

The 2-bit SRS request field [5 TS38.212] in DCI format 0_1, 1_1 indicates the triggered SRS resource set given in Table 7.3.1.1.2-24 of [5, TS 38212]. The 2-bit SRS request field [5, TS38.212] in DCI format 2_3 indicates the triggered SRS resource set given in Subclause 11.4 of [6, TS 38.213].

3GPP TS 38.331 provides the following description:

SRS-Config

The SRS-Config 1E is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI).

SRS-Config Information Element

```
-- ASN1START
-- TAG-SRS-CONFIG-START
SRS-Config ::=                          SEQUENCE {
    srs-ResourceSetToReleaseList            SEQUENCE (SIZE(0..maxNrofSRS-ResourceSets)) OF SRS-ResourceSetId           OPTIONAL,    -- Need N
    srs-ResourceSetToAddModList             SEQUENCE (SIZE(0..maxNrofSRS-ResourceSets)) OF SRS-ResourceSet             OPTIONAL,    -- Need N
    srs-ResourceToReleaseList               SEQUENCE (SIZE(1..maxNrofSRS-Resources)) OF SRS-ResourceId OPTIONAL,       -- Need N
    srs-ResourceToAddModList                SEQUENCE (SIZE(1..maxNrofSRS-Resources)) OF SRS-Resource              OPTIONAL,    -- Need N
    -- If absent, UE applies TPC commands via accumulation. If disabled, UE applies the TPC command without accumulation
    -- (this applies to SRS when a separate closed loop is configured for SRS)
    -- Corresponds to L1 parameter 'Accumulation-enabled-srs' (see 38,213, section 7.3)
    tpc-Accumulation                        ENUMERATED {disabled} OPTIONAL, -- Need S
    ...
}
SRS-ResourceSet ::=                     SEQUENCE {
    -- The ID of this resource set. It is unique in the context of the BWP in which the parent SRS-Config is defined.
    srs-ResourceSetId                       SRS-ResourceSetId,
    -- The IDs of the SRS-Reosurces used in this SRS-ResourceSet
    srs-ResourceIdList                      SEQUENCE (SIZE(1..maxNrofSRS-ResourcesPerSet)) OF SRS-ResourceId    OPTIONAL, -- Cond Setup
    resourceType                            CHOICE {
        aperiodic                               SEQUENCE {
            -- The DCI "code point" upon which the UE shall transmit SRS according to this SRS resource set configuration.
            -- Corresponds to L1 parameter 'AperiodicSRS-ResourceTrigger' (see 38.214, section 6.1.1.2)
            aperiodicSRS-ResourceTrigger            INTEGER (0..maxNrofSRS-TriggerStates-1),
            -- ID of CSI-RS resource associated with this SRS resource set. (see 38.214, section 6.1.1.2)
            csi-RS                                  NZP-CSI-RS-ResourceId,
            -- An offset in number of slots between the triggering DCI and the actual transmission of this SRS-ResourceSet.
            -- If the field is absent the UE applies no offset (value 0)
            slotOffset                              INTEGER (1..8) OPTIONAL, -- Need S
            ...
        },
        semi-persistent                         SEQUENCE {
            -- ID of CSI-RS resource associated with this SRS resource set in non-codebook based operation.
            -- Corresponds to L1 parameter 'SRS-AssocCSIRS' (see 38.214, section 6.2.1)
            associatedCSI-RS        NZP-CSI-RS-ResourceId OPTIONAL, -- Cond nonCodebook
            ...
        },
        periodic                                SEQUENCE {
            -- ID of CSI-RS resource associated with this SRS resource set in non-codebook based operation.
            -- Corresponds to L1 parameter 'SRS-AssocCSIRS' (see 38.214, section 6.2.1)
            associatedCSI-RS        NZP-CSI-RS-ResourceId OPTIONAL, -- Cond nonCodebook
            ...
        }
    },
    -- Indicates if the SRS resource set is used for beam management vs. used for either codebook based or non-codebook based transmission.
    -- Corresponds to L1 parameter 'SRS-SetUse' (see 38.214, section 6.2.1)
    -- FFS_CHECK: Isn't codebook/noncodebook already known from the ulTxConfig in the SRS-Config? If so, isn't the only distinction
    -- in the set between BeamManagement, AtennaSwitching and "Other"? Or what happens if SRS-Config=Codebook but a Set=NonCodebook?
    usage                                   ENUMERATED {beamManagement, codebook, nonCodebook, antennaSwitching},
    -- alpha value for SRS power control. Corresponds to L1 parameter 'alpha-srs' (see 38.213, section 7.3)
    -- When the field is absent the UE applies the value 1
    alpha                                   Alpha           OPTIONAL, -- Need S
    -- P0 value for SRS power control. The value is in dBm. Only even values (step size 2) are allowed.
    -- Corresponds to L1 parameter 'p0-srs' (see 38.213, section 7.3)
    p0                                      INTEGER (-202..24)       OPTIONAL, -- Cond Setup
    -- A reference signal (e.g. a CSI-RS config or a SSblock) to be used for SRS path loss estimation.
    -- Corresponds to L1 parameter 'srs-pathlossReference-rs-config' (see 38.213, section 7.3)
    pathlossReferenceRS                     CHOICE {
        ssb-Index                               SSB-Index,
```

```
        csi-RS-Index                        NZP-CSI-RS-ResourceId
    }   OPTIONAL, -- Need M
    -- Indicates whether hsrs,c(i) = fc(i,1) or hsrs,c(i) = fc(i,2) (if twoPUSCH-PC-
AdjustmentStates are configured)
    -- or serarate close loop is configured for SRS. This parameter is applicable only for Uls on
which UE also transmits PUSCH.
    -- If absent or release, the UE applies the value sameAs-Fci1
    -- Corresponds to L1 parameter 'srs-pcadjustment-state-config' (see 38.213, section 7.3)
    srs-PowerControlAdjustmentStates        ENUMERATED { sameAsFci2, separateClosedLoop}
    OPTIONAL, -- Need S
    ...
}
SRS-ResourceSetId ::=                       INTEGER (0..maxNrofSRS-ResourceSets-1)
SRS-Resource ::=                            SEQUENCE {
    srs-ResourceId                          SRS-ResourceId,
    nrofSRS-Ports                           ENUMERATED {port1, ports2, ports4},
    -- The PTRS port index for this SRS resource for non-codebook based UL MIMO. This is only
applicable when the corresponding
    -- PTRS-UplinkConfig is set to CP-OFDM. The ptrs-PortIndex configured here must be smaller
than or equal to the maxNnrofPorts
    -- configured in the PTRS-UplinkConfig.
    -- Corresponds to L1 parameter 'UL-PTRS-SRS-mapping-non-CB' (see 38.214, section 6.1)
    ptrs-PortIndex                          ENUMERATED {n0, n1 } OPTIONAL, -- Need R
    -- Comb value (2 or 4) and comb offset (0..combValue−1). Corresponds to L1 parameter 'SRS-
TransmissionComb' (see 38.214, section 6.2.1)
    transmissionComb                        CHOICE {
        n2                                      SEQUENCE {
            combOffset-n2                           INTEGER (0..1),
            -- Cyclic shift configuration. Corresponds to L1 parameter 'SRS-CyclicShiftConfig'
(see 38.214, section 6.2.1)
            cyclicShift-n2                          INTEGER (0..7)
        },
        n4                                      SEQUENCE {
            combOffset-n4                           INTEGER (0..3),
            -- Cyclic shift configuration. Corresponds to L1 parameter 'SRS-CyclicShiftConfig'
(see 38.214, section 6.2.1)
            cyclicShift-n4                          INTEGER (0..11)
        }
    },
    -- OFDM symbol location of the SRS resource within a slot including number of OFDM symbols (N
= 1, 2 or 4 per SRS resource),
    -- startPosition (SRSSymbolStartPosition = 0..5; "0" refers to the last symbol, "1" refers to
the second last symbol) and
    -- RepetitionFactor (r = 1, 2 or 4).
    -- Corresponds to L1 parameter 'SRS-ResourceMapping' (see 38.214, section 6.2.1 and 38.211,
section 6.4.1.4).
    -- FFS: Apparently, RAN1 considers replacing these three fields by a table in RAN1 specs and
a corresponding index in ASN.1?!
    resourceMapping                         SEQUENCE {
        startPosition                           INTEGER (0..5),
        nrofSymbols                             ENUMERATED {n1, n2, n4},
        repetitionFactor                        ENUMERATED {n1, n2, n4}
    },
    -- Parameter(s) defining frequency domain position and configurable shift to align SRS
allocation to 4 PRB grid.
    -- Corresponds to L1 parameter 'SRS-FreqDomainPosition' (see 38.214, section 6.2.1)
    freqDomainPosition                      INTEGER (0..67),
    freqDomainShift                         INTEGER (0..268),
    -- Includes parameters capturing SRS frequency hopping
    -- Corresponds to L1 parameter 'SRS-FreqHopping' (see 38.214, section 6.2.1)
    freqHopping                             SEQUENCE {
        c-SRS                                   INTEGER (0..63),
        b-SRS                                   INTEGER (0..3),
        b-hop                                   INTEGER (0..3)
    },
    -- Parameter(s) for configuring group or sequence hopping
    -- Corresponds to L1 parameter 'SRS-GroupSequenceHopping' (see 38.211, section FFS_Section)
    groupOrSequenceHopping                  ENUMERATED { neither, groupHopping, sequenceHopping
},
    -- Time domain behavior of SRS resource configuration.
    -- Corresponds to L1 parameter 'SRS-ResourceConfigType' (see 38.214, section 6.2.1).
    -- For codebook based uplink transmission, the network configures SRS resources in the same
resource set with the same
    -- time domain behavior on periodic, aperiodic and semi-persistent SRS.
    -- FFS: Add configuration parameters for the different SRS resource types?
    resourceType                            CHOICE {
        aperiodic                               SEQUENCE {
            ...
        },
```

```
            semi-persistent                        SEQUENCE {
                -- Periodicity and slot offset for for this SRS resource. All values in "number of
slots".
                -- sl1 corresponds to a periodicity of 1 slot, value sl2 corresponds to a periodicity
of 2 slots, and so on.
                -- For each periodicity the corresponding offset is given in number of slots. For
periodicity sl1 the offset is 0 slots.
                -- Corresponds to L1 parameter 'SRS-SlotConfig' (see 38.214, section 6.2.1)
                periodicityAndOffset-sp            SRS-PeriodicityAndOffset,
                ...
            },
            periodic                              SEQUENCE {
                -- Periodicity and slot offset for for this SRS resource. All values in "number of
slots"
                -- sl1 corresponds to a periodicity of 1 slot, value sl2 corresponds to a periodicity
of 2 slots, and so on.
                -- For each periodicity the corresponding offset is given in number of slots. For
periodicity sl1 the offset is 0 slots.
                -- Corresponds to L1 parameter 'SRS-SlotConfig' (see 38.214, section 6.2.1)
                periodicityAndOffset-p             SRS-PeriodicityAndOffset,
                ...
            }
        },
        -- Sequence ID used to initialize psedo random group and sequence hopping.
        -- Corresponds to L1 parameter 'SRS-SequenceId' (see 38.214, section 6.2.1)
        sequenceId                                 BIT STRING (SIZE (10)),
        -- Configuration of the spatial relation between a reference RS and the target SRS. Reference
RS can be SSB/CSI-RS/SRS
        -- Corresponds to L1 parameter 'SRS-SpatialRelationInfo' (see 38.214, section 6.2.1)
        spatialRelationInfo                        CHOICE {
            ssb-Index                              SSB-Index,
            csi-RS-Index                                    NZP-CSI-RS-ResourceId,
            srs                                    SRS-ResourceId
        }   OPTIONAL,   -- Need R
        ...
    }
}
SRS-ResourceId ::=                                 INTEGER (0..maxNrofSRS-Resources-1)
SRS-PeriodicityAndOffset ::=                       CHOICE {
    sl1                                            NULL,
    sl2                                            INTEGER(0..1),
    sl4                                            INTEGER(0..3),
    sl5                                            INTEGER(0..4),
    sl8                                            INTEGER(0..7),
    sl10                                           INTEGER(0..9),
    sl16                                           INTEGER(0..15),
    sl20                                           INTEGER(0..19),
    sl32                                           INTEGER(0..31),
    sl40                                           INTEGER(0..39),
    sl64                                           INTEGER(0..63),
    sl80                                           INTEGER(0..79),
    sl160                                          INTEGER(0..159),
    sl320                                          INTEGER(0..319),
    sl640                                          INTEGER(0..639),
    sl1280                                         INTEGER(0..1279),
    sl2560                                         INTEGER(0..2559)
}
-- TAG-SRS-CONFIG-STOP
-- ASN1STOP
```

| Conditional Presence | Explanation |
|---|---|
| Setup | This field is mandatory present upon configuration of SRS-ResourceSet or SRS-Resource and optional (Need M) otherwise |

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

In NR, an uplink data transmission (PUSCH) can be scheduled by DCI format 0_0 and DCI format 0_1. For PUSCH scheduled by DCI format 0_1, UL beam indication, i.e. transmission precoder or spatial relation/parameter or spatial domain transmission filter for transmitting scheduled PUSCH, can be indicated by SRI field in DCI format 0_1. For PUSCH scheduled by DCI format 0_0, since no SRI field is configured or indicated in the DCI format 0_0, UL beam indication is achieved by transmission precoder or spatial relation/parameter or spatial domain transmission filter for transmitting the PUCCH resource with the lowest resource ID configured in active UL BWP. However, this application is suitable for a serving cell configured with PUCCH resource. For PUSCH scheduled by DCI format 0_0 in a serving cell without configured PUCCH resource, how the UL beam indication of scheduled PUSCH is achieved is still unclear now.

One solution is to use or refer to PUCCH resource of the serving cell in the same PUCCH cell group. However, if the serving cell where PUSCH scheduled by DCI format 0_0 is transmitted (assume CC2) and the serving cell with PUCCH resource configured in the same PUCCH cell group (assume CC1) are interband or non-co-located, the spatial relation between PUCCH in CC1 and scheduled PUSCH in CC2 may not be able to be shared. For example, CC1 is located in frequency range 1 (e.g. PCell) and CC2 is located in frequency range 2, the spatial relation for transmitting PUSCH scheduled in CC2 may not be referred to or derived from PUCCH resource in CC1.

In this invention, the following solutions or embodiments are provided, which can be at least (but not limited to) used to handle issues mentioned above.

One concept of this invention is that a UE is configured with a serving cell. The serving cell is not configured with PUCCH resource(s). The serving cell is configured with SRS resource(s). The serving cell is configured with uplink component carrier or uplink resource(s). The serving cell is activated. The UE is indicated to transmit a PUSCH in the serving cell, wherein the PUSCH is scheduled by a DCI format without spatial relation field, e.g. DCI format 0_0. In one embodiment, the UE may transmit the PUSCH using the spatial relation (or parameter) or spatial domain transmission filter or transmission precoder for transmitting a SRS resource in the serving cell.

Another concept of this invention is that a UE is configured with a serving cell. The serving cell is not configured with PUCCH resource(s). The serving cell may or may not be configured with SRS resource(s). The serving cell is configured with uplink component carrier or uplink resource(s). The serving cell is activated. The UE is indicated to transmit a PUSCH in the serving cell, wherein the PUSCH is scheduled by a DCI format without spatial relation field, e.g. DCI format 0_0.

In one embodiment, the UE may transmit the PUSCH using the spatial relation/parameter or spatial domain transmission filter or transmission precoder for transmitting a PUCCH resource in a referred serving cell. The referred serving cell could be a serving cell configured with PUCCH resource, e.g. PCell, PSCell. The spatial relation can be shared between the serving cell and the referred serving cell.

In one embodiment, the serving cell and the referred serving cell could be in the same PUCCH cell group. The referred serving cell could be configured with uplink component carrier or uplink resource. The referred serving cell could be activated.

Another concept of this invention is that a UE is configured with a serving cell. The serving cell is not configured with PUCCH resource(s). The serving cell may or may not be configured with SRS resource(s). The serving cell is configured with uplink component carrier or uplink resource(s). The serving cell is activated. The UE is indicated to transmit a PUSCH in the serving cell, wherein the PUSCH is scheduled by a DCI format without spatial relation field, e.g. DCI format 0_0.

In one embodiment, the UE could ignore or discard the scheduled resource for transmitting the PUSCH. The UE could also ignore or discard the DCI format.

In one embodiment, the UE may not transmit the PUSCH. Additionally or alternatively, the UE may transmit the PUSCH via a spatial relation (or parameter) or spatial domain transmission filter or transmission precoder which is determined by the UE. The UE may not transmit the PUSCH using the spatial relation (or parameter) or spatial domain transmission filter or transmission precoder for transmitting a SRS resource in the serving cell.

In one embodiment, the UE may not transmit the PUSCH using the spatial relation (or parameter) or spatial domain transmission filter or transmission precoder for transmitting a PUCCH resource in a referred serving cell.

In one embodiment, the UE may be unable to transmit the PUSCH using the spatial relation (or parameter) or spatial domain transmission filter or transmission precoder for transmitting a PUCCH resource in the referred serving cell. The referred serving cell could be a serving cell configured with PUCCH resource, e.g. PCell, PSCell.

In one embodiment, spatial relation can be shared between the serving cell and the referred serving cell. In one embodiment, the UE may not transmit the PUSCH using the spatial relation (or parameter) or spatial domain transmission filter or transmission precoder for transmitting a PUCCH resource in all serving cell(s) configured with PUCCH resource(s), e.g. PCell, PSCell.

Another concept of this invention is that a UE is configured with a serving cell. The UE is indicated to activate an active UL BWP. The serving cell or the UL active BWP is not configured with PUCCH resource(s). The serving cell may or may not be configured with SRS resource(s). The serving cell is configured with uplink component carrier or uplink resource(s). The serving cell is activated. The serving cell is activated, which implies that the UE is in RRC connected mode.

In one embodiment, the UE may not expect to be indicated to transmit a PUSCH in the serving cell, wherein the PUSCH is scheduled by a DCI format without spatial relation field, e.g. DCI format 0_0. The UE may not expect to be indicated to transmit a PUSCH in the active UL BWP in the serving cell, wherein the PUSCH is scheduled by a DCI format without spatial relation field, e.g. DCI format 0_0. This implies that network may not (be allowed to) indicate the UE to transmit a PUSCH in the serving cell or in the active BWP via a DCI format without spatial relation field, e.g. DCI format 0_0. This implies that network may prevent from indicating the UE to transmit a PUSCH in the serving cell or in the active UL BWP via a DCI format without spatial relation field, e.g. DCI format 0_0.

In one embodiment, the UE may not expect to be configured with a search space configured with DCI format 0_0, i.e. dci-Formats is configured as formats0-0-And-1-0, wherein the search space is associated with a CORESET monitored or received in the serving cell. This implies that network may not configure a search space to the UE, wherein the search space is associated with monitoring and/or receiving DCI format 0_0 in the serving cell.

In one embodiment, if the UE is indicated to transmit a PUSCH in the serving cell, wherein the PUSCH is scheduled by a DCI format without spatial relation field, e.g. DCI format 0_0, the UE may ignore or discard the scheduled resource for transmitting the PUSCH. This implies that if network indicates the UE to transmit a PUSCH in the serving cell or in the active UL BWP, wherein the PUSCH is scheduled by the DCI format without spatial relation field, e.g. DCI format 0_0, network does not receive the PUSCH. In one embodiment, if the UE is indicated to transmit a PUSCH in the serving cell, wherein the PUSCH is scheduled by a DCI format without spatial relation field, e.g. DCI format 0_0, the UE may ignore or discard the DCI format. This implies that if network indicates the UE to transmit a PUSCH in the serving cell or in the active UL BWP, wherein the PUSCH is scheduled by the DCI format without spatial relation field, e.g. DCI format 0_0, network does not receive the PUSCH.

In one embodiment, if the UE is indicated to transmit a PUSCH in the serving cell or in the active UL BWP, wherein the PUSCH is scheduled by a DCI format without spatial relation field, e.g. DCI format 0_0, the UE may not transmit the PUSCH. This implies that if network indicates the UE to transmit a PUSCH in the serving cell or in the active UL BWP, wherein the PUSCH is scheduled by the DCI format without spatial relation field, e.g. DCI format 0_0, network does not receive the PUSCH.

Additionally or alternatively, if the UE is indicated to transmit a PUSCH in the serving cell or in the active UL BWP, wherein the PUSCH is scheduled by a DCI format without spatial relation field, e.g. DCI format 0_0, the UE may transmit the PUSCH via a spatial relation (or parameter) or spatial domain transmission filter or transmission precoder which is determined by the UE.

Another concept of this invention is that a UE is configured with a serving cell. The UE is indicated or activated an active UL BWP. The serving cell is not configured with PUCCH resource(s). The active UL BWP is not configured with PUCCH resource(s). The serving cell may or may not be configured with SRS resource(s). The serving cell is configured with uplink component carrier or uplink resource(s). The serving cell is activated. The UE is indicated to transmit a PUSCH in the serving cell, wherein the PUSCH is scheduled by a DCI format without spatial relation field, e.g. DCI format 0_0.

In one embodiment, the UE may transmit the PUSCH using a spatial relation (or parameter) or spatial domain transmission filter or transmission precoder derived from or related to a DL reference signal resource. In one embodiment, the UE may transmit the PUSCH via using a spatial relation (or parameter) or spatial domain transmission filter or transmission precoder derived from or related to the spatial relation (or parameter) or spatial domain reception filter or beam for receiving the DL reference signal resource. The UE may transmit the PUSCH using the spatial relation (or parameter or filter) or the beam for receiving the DL reference signal resource. The UE may also transmit the PUSCH using the transmission beam derived from the receiving beam for receiving the DL reference signal resource.

In one embodiment, the DL reference signal resource may be transmitted in the serving cell or a serving cell other than the serving cell. The DL reference signal resource can be SSB resource, CSI-RS resource. The DL reference signal resource or index of the DL reference signal resource can be reported in the most recent beam report or the most recent CSI report for L1-RSRP. More specifically, the DL reference signal resource or index of the DL reference signal resource could be with the best measured quality (e.g. the largest RSRP, the largest SINR, the lowest BLER) in the most recent beam report or the most recent CSI report for L1-RSRP.

In one embodiment, the DL reference signal resource could be the same as a DL reference signal associated with a TCI state, wherein the TCI state is applied for receiving the CORESET in which the DCI is received. The antenna port of the DL reference signal resource and the DM-RS antenna port associated with PDCCH receptions in the CORESET in which the DCI is received are quasi co-located with respect to, for example, delay spread, Doppler spread, Doppler shift, average delay, and spatial RX parameters.

In one embodiment, the DL reference signal resource could be the same as a DL reference signal associated with a TCI state, wherein the TCI state is applied for receiving the CORESET with the lowest CORESET-ID in the latest slot in which one or more CORESETs within the active BWP of the serving cell are configured for the UE. It implies that the TCI state is applied for receiving the CORESET with the lowest CORESET-ID monitored in the latest slot in which one or more configured CORESETs within the active BWP of the serving cell are monitored by the UE. The antenna port of the DL reference signal resource and the DM-RS antenna port associated with PDCCH receptions in a CORESET are quasi co-located with respect to, e.g. delay spread, Doppler spread, Doppler shift, average delay, and spatial RX parameters, wherein the CORESET is with the lowest COREST-ID in the latest slot in which one or more CORESETs within the active BWP of the serving cell are configured for the UE. This implies the CORESET comprises lowest CORESET-ID monitored in the latest slot in which one or more CORESETs within the active BWP of the serving cell are monitored by the UE.

Each concept discussed above can be formed or implemented as an embodiment. Any combination of concepts discussed above can also be formed or implemented as a embodiment. The followings are some exemplary embodiments.

Exemplary Embodiment 1

In one embodiment, a UE is configured with a serving cell. The serving cell is not configured with PUCCH resource(s). The serving cell is configured with SRS resource(s). The serving cell is configured with uplink component carrier or uplink resource(s). The serving cell is activated. The UE is indicated to transmit a PUSCH in the serving cell, wherein the PUSCH is scheduled by a DCI format without spatial relation field, e.g. DCI format 0_0.

In one embodiment, the UE may transmit the PUSCH via using the spatial relation (or parameter) or spatial domain transmission filter or transmission precoder for transmitting a SRS resource in the serving cell. The SRS resource may be a SRS resource with the lowest resource ID configured in active BWP in the serving cell, or a SRS resource with the lowest resource ID in a SRS resource set configured in active BWP in the serving cell. In one embodiment, the SRS resource set could be with the lowest resource set ID among SRS resource sets for particular application or usage, e.g. beam management, SRS antenna switching, codebook based uplink transmission, non-codebook based uplink transmission, etc.

In one embodiment, the SRS resource set could be configured for beam management, for SRS antenna switching, for codebook based uplink transmission, or for non-codebook based uplink transmission. In one embodiment, the SRS resource could be a SRS resource associated with a DL reference signal resource or index of a DL reference signal resource, e.g. SSB resource, CSI-RS resource. More specifically, spatialRelationInfo configured for the SRS resource could indicate the DL reference signal resource or index of the DL reference signal resource, e.g. ssb-Index, csi-RS-index.

In one embodiment, the DL reference signal resource or index of the DL reference signal resource could be reported in the most recent beam report or the most recent CSI report for L1-RSRP. More specifically, the DL reference signal resource or index of the DL reference signal resource could be with the best measured quality (e.g. the largest RSRP, the largest SINR, the lowest BLER) in the most recent beam report or the most recent CSI report for L1-RSRP. In one embodiment, the UE could determine whether to transmit the PUSCH via using the spatial relation (or parameter) or spatial domain transmission filter or transmission precoder for transmitting the SRS resource or not based on an explicit indication or an implicit indication.

In one embodiment, the explicit indication may be an RRC parameter, a MAC-CE command, a DCI field. In one embodiment, the implicit indication may be one or more than one RRC parameter (for other purpose) is set to a specific value or setting, e.g. no SRS resource set is configured for particular application in the serving cell, for example, beam management. The implicit indication may also be one or more than one MAC-CE command (for other purpose) is set to a specific value or setting. In addition, the implicit indication may be one or more than one DCI field (for other purpose) is set to a specific value or setting.

Exemplary Embodiment 2

In another embodiment, a UE is configured with a first serving cell. The first serving cell is not configured with PUCCH resource(s). The first serving cell may or may not be configured with SRS resource(s). The first serving cell is configured with uplink component carrier or uplink resource. The first serving cell is activated. The UE is indicated to transmit a PUSCH in the first serving cell, wherein the PUSCH is scheduled by a DCI format without spatial relation field, e.g. DCI format 0_0.

In one embodiment, the UE could transmit the PUSCH using the spatial relation (or parameter) or spatial domain transmission filter or transmission precoder for transmitting a PUCCH resource in a second serving cell. The PUCCH resource in the second serving cell could be a PUCCH resource with the lowest resource ID configured in active UL BWP in the second serving cell. The second serving cell could be a serving cell configured with PUCCH resource, e.g. PCell, PSCell. The spatial relation could be shared between the first serving cell and the second serving cell.

In one embodiment, the first serving cell and the second serving cell could be in the same PUCCH cell group. The second serving cell could be configured with uplink component carrier or uplink resource(s). The second serving cell could be activated.

In one embodiment, the UE could determine whether to transmit the PUSCH using the spatial relation (or parameter) or spatial domain transmission filter or transmission precoder for transmitting a PUCCH resource in the second serving cell or not based on an explicit indication or an implicit indication. In one embodiment, the explicit indication may be an RRC parameter, a MAC-CE command, or a DCI field. In one embodiment, the implicit indication may be one or more than one RRC parameter (for other purpose) is set to a specific value or setting. The implicit indication may also be one or more than one MAC-CE command (for other purpose) is set to a specific value or setting. In addition, the implicit indication may be one or more than one DCI field (for other purpose) is set to a specific value or setting.

Exemplary Embodiment 3

In another embodiment, a UE is configured with a first serving cell. The first serving cell is not configured with PUCCH resource(s). The first serving cell may or may not configured with SRS resource(s). The first serving cell is configured with uplink component carrier or uplink resource(s). The first serving cell is activated. The UE is indicated to transmit a PUSCH in the first serving cell, wherein the PUSCH is scheduled by a DCI format without spatial relation field, e.g. DCI format 0_0.

In one embodiment, the UE could ignore or discard the scheduled resource for transmitting the PUSCH. The UE could ignore or discard the DCI format. In one embodiment, the UE may not transmit the PUSCH. Additionally or alternatively, the UE may transmit the PUSCH via a spatial relation (or parameter) or spatial domain transmission filter or transmission precoder which is determined by the UE.

In one embodiment, the UE may not transmit the PUSCH via using the spatial relation (or parameter) or spatial domain transmission filter or transmission precoder for transmitting a SRS resource in the first serving cell. In one embodiment, the UE could be explicitly or implicitly indicated to not transmit the PUSCH using the spatial relation (or parameter) or spatial domain transmission filter or transmission precoder for transmitting a SRS resource in the first serving cell.

In one embodiment, the UE may be unable to transmit the PUSCH via using the spatial relation (or parameter) or spatial domain transmission filter or transmission precoder for transmitting a SRS resource in the first serving cell. In one embodiment, the SRS resource could be a SRS resource with the lowest resource ID configured in active BWP in the first serving cell, or a SRS resource with the lowest resource ID in a SRS resource set configured in active BWP in the first serving cell.

In one embodiment, the SRS resource set could be with the lowest resource set ID among SRS resource sets for particular application or usage, e.g. beam management, SRS antenna switching, codebook based uplink transmission, non-codebook based uplink transmission, etc. In one embodiment, the SRS resource set could be configured for beam management, for SRS antenna switching, for codebook based uplink transmission, or for non-codebook based uplink transmission.

In one embodiment, the UE may not transmit the PUSCH using the spatial relation (or parameter or) spatial domain transmission filter or transmission precoder for transmitting a PUCCH resource in a second serving cell. In one embodiment, the UE could be explicitly or implicitly indicated to not transmit the PUSCH via using the spatial relation (or parameter) or spatial domain transmission filter or transmission precoder for transmitting a PUCCH resource in the second serving cell.

In one embodiment, the UE may be unable to transmit the PUSCH via using the spatial relation (or parameter) or spatial domain transmission filter or transmission precoder for transmitting a PUCCH resource in the second serving cell. The PUCCH resource in the referred serving cell could be a PUCCH resource with the lowest resource ID configured in active UL BWP in the second serving cell. The second serving cell could be a serving cell configured with PUCCH resource(s), e.g. PCell, PSCell. The spatial relation can be shared between the first serving cell and the second serving cell.

In one embodiment, the first serving cell and the second serving cell could be in the same PUCCH cell group. The second serving cell could be configured with uplink component carrier or uplink resource(s). The second serving cell could be activated.

In one embodiment, the UE may not transmit the PUSCH via using the spatial relation (or parameter) or spatial domain transmission filter or transmission precoder for transmitting a PUCCH resource in PCell, PSCell, and/or a serving cell configured with PUCCH resource(s). In one embodiment, the UE could be explicitly or implicitly indicated to not transmit the PUSCH via using the spatial relation (or parameter) or spatial domain transmission filter or transmission precoder for transmitting a PUCCH resource in PCell, PSCell, and/or a serving cell configured with PUCCH resource(s).

In one embodiment, the UE may be unable to transmit the PUSCH via using the spatial relation (or parameter) or spatial domain transmission filter or transmission precoder for transmitting a PUCCH resource in PCell, PSCell, and/or a serving cell configured with PUCCH resource(s).

Exemplary Embodiment 4

In another embodiment, a UE is configured with a first serving cell. The UE is indicated or activated an active UL BWP. The first serving cell or the active UL BWP is not configured with PUCCH resource(s). The first serving cell may or may not be configured with SRS resource(s). The first serving cell is configured with uplink component carrier or uplink resource(s). The UE is indicated to activate the first serving cell. The UE is in RRC connected mode.

In one embodiment, the UE may not expect to be indicated to transmit a first PUSCH in the first serving cell or in the active UL BWP, wherein the first PUSCH is scheduled by a DCI format without spatial relation field, e.g. DCI format 0_0. In one embodiment, the UE may not expect to be indicated to transmit a first PUSCH in the first serving cell or in the active UL BWP in RRC connected mode, wherein the first PUSCH is scheduled by a DCI format without spatial relation field, e.g. DCI format 0_0. This may be interpreted as that, in an active UL BWP or a serving cell without at least one PUCCH resource providing spatial relation configured, the UE may be unable to or may not transmit a PUSCH scheduled by a DCI not indicating spatial relation.

In one embodiment, the UE may transmit a second PUSCH in the first serving cell through spatial relation indicated by a DCI format with spatial relation field, e.g. DCI format 0_1, wherein the second PUSCH is scheduled by the DCI format with spatial relation field. In one embodiment, the UE is configured with a second serving cell. The second serving cell is configured with PUCCH resource(s). In one embodiment, the UE may transmit a third PUSCH in the second serving cell through the spatial relation for transmitting the PUCCH resource with the lowest resource ID configured in active UL BWP in the second serving cell, wherein the third PUSCH is scheduled by a DCI format without spatial relation field, e.g. DCI format 0_0.

In one embodiment, the UE may not expect to be configured with a search space configured with DCI format 0_0, i.e. dci-Formats is configured as formats0-0-And-1-0, wherein the search space is associated with a CORESET monitored/received in the first serving cell. In one embodiment, the UE may not expect to be configured with a search space for monitoring DCI format 0_0, wherein the search space is associated with a CORESET monitored and/or received in the first serving cell.

In one embodiment, if the UE is indicated to transmit the first PUSCH in the first serving cell or in the active UL BWP, wherein the first PUSCH is scheduled by a DCI format without spatial relation field, e.g. DCI format 0_0, the UE could ignore or discard the scheduled resource for transmitting the first PUSCH. In one embodiment, if the UE is indicated to transmit the first PUSCH in the first serving cell or in the active UL BWP, wherein the first PUSCH is scheduled by a DCI format without spatial relation field, e.g. DCI format 0_0, the UE could ignore or discard the DCI format.

In one embodiment, if the UE is indicated to transmit the first PUSCH in the first serving cell or in the active UL BWP, wherein the first PUSCH is scheduled by a DCI format without spatial relation field, e.g. DCI format 0_0, the UE may not transmit the first PUSCH. Additionally or alternatively, if the UE is indicated to transmit the first PUSCH in the first serving cell or in the active UL BWP, wherein the first PUSCH is scheduled by a DCI format without spatial relation field, e.g. DCI format 0_0, the UE could transmit the first PUSCH via a spatial relation (or parameter) or spatial domain transmission filter or transmission precoder which is determined by the UE.

This embodiment also implies implementation from perspective of a network. The network may configure a first serving cell to a UE. The network may indicate or active an active UL BWP to the UE. The network may not configure PUCCH resource(s) in the first serving cell or in the active UL BWP. The network may or may not configure SRS resource(s) in the first serving cell. The network may configure uplink component carrier or uplink resource(s) in the first serving cell. The network could indicate the UE to activate the first serving cell. The UE could be in RRC connected mode.

In one embodiment, the network may not indicate the UE to transmit a first PUSCH in the first serving cell or in the active UL BWP via a DCI format without spatial relation field. The network may prevent from or not be allowed to indicate the UE to transmit the first PUSCH in the first serving cell or in the active UL BWP via a DCI format without spatial relation field. The network may not indicate the UE to transmit a first PUSCH in the first serving cell or in the active UL BWP via a DCI format without spatial relation field when the UE is in RRC connected mode. The network may prevent from or not be allowed to indicate the UE to transmit the first PUSCH in the first serving cell or in the active UL BWP via a DCI format without spatial relation field when the UE is in RRC connected mode. This may be interpreted as that, in an active UL BWP or a serving cell without a PUCCH resource providing spatial relation, the network may prevent from or may not be allowed to or may not indicate the UE to transmit a PUSCH scheduled by a DCI not indicating spatial relation.

In one embodiment, the network may indicate the UE to transmit a second PUSCH in the first serving cell or in the active UL BWP, wherein the second PUSCH is scheduled by a DCI format with spatial relation field, e.g. DCI format 0_1. In one embodiment, the second PUSCH is transmitted through spatial relation indicated in the DCI format with spatial relation field.

In one embodiment, the network may configure a second serving cell to the UE. The network may configure PUCCH resource(s) in the second serving cell. The network may indicate the UE to transmit a third PUSCH in a second serving cell, wherein the third PUSCH is scheduled by a DCI format without spatial relation field, e.g. DCI format 0_0. The third PUSCH may be transmitted through the spatial relation for transmitting the PUCCH resource with the lowest resource ID configured in active UL BWP in the second serving cell.

In one embodiment, the network may not configure a search space to the UE, wherein the search space is associated with monitoring and/or receiving DCI format 0_0 in the first serving cell. If the network indicates the UE to transmit the first PUSCH in the first serving cell or in the active UL BWP, wherein the first PUSCH is scheduled by the DCI format without spatial relation field, the network may not receive the first PUSCH.

Exemplary Embodiment 5

In another embodiment, a UE is configured with a serving cell. The serving cell is not configured with PUCCH resource(s). The serving cell may or may not be configured with SRS resource(s). The serving cell is configured with uplink component carrier or uplink resource(s). The serving cell is activated. The UE is indicated to transmit a PUSCH in the serving cell, wherein the PUSCH is scheduled by a DCI format without spatial relation field, e.g. DCI format 0_0.

In one embodiment, the UE may transmit the PUSCH via using a spatial relation (or parameter) or spatial domain transmission filter or transmission precoder derived from or related to a DL reference signal resource. In one embodiment, the UE may transmit the PUSCH via using a spatial relation (or parameter) or spatial domain transmission filter or transmission precoder derived from or related to the spatial relation (or parameter) or spatial domain reception filter or beam for receiving the DL reference signal resource. The UE could transmit the PUSCH using the spatial relation (or parameter or filter) or beam for receiving the DL reference signal resource. The UE could transmit the PUSCH using the transmission beam derived from the receiving beam for receiving the DL reference signal resource.

In one embodiment, the DL reference signal resource could be transmitted in the serving cell. Additionally or alternatively, the DL reference signal resource could be transmitted in a serving cell other than the serving cell. The DL reference signal resource can be SSB resource, or CSI-RS resource. The DL reference signal resource or index of the DL reference signal resource could be reported in the most recent beam report or the most recent CSI report for L1-RSRP. More specifically, the DL reference signal resource or index of the DL reference signal resource could be with the best measured quality (e.g. the largest RSRP, the largest SINR, the lowest BLER) in the most recent beam report or the most recent CSI report for L1-RSRP.

In one embodiment, the DL reference signal resource could be the same as a DL reference signal associated with a TCI state, wherein the TCI state is applied for receiving the CORESET in which the DCI is received. The antenna port of the DL reference signal resource and the DM-RS antenna port associated with PDCCH receptions in the CORESET in which the DCI is received could be quasi co-located with respect to, for example, delay spread, Doppler spread, Doppler shift, average delay, and spatial RX parameters.

In one embodiment, the DL reference signal resource could be the same as a DL reference signal associated with a TCI state, wherein the TCI state is applied for receiving the CORESET with the lowest CORESET-ID in the latest slot in which one or more CORESETs within the active BWP of the serving cell are configured for the UE. The TCI state is applied for receiving CORESET with the lowest CORESET-ID in the latest slot in which one or more CORESETs within the active BWP of the serving cell are monitored by the UE. The antenna port of the DL reference signal resource and the DM-RS antenna port associated with PDCCH receptions in a CORESET could be quasi co-located with respect to, for example, delay spread, Doppler spread, Doppler shift, average delay, and spatial RX parameters, wherein the CORESET is with the lowest COREST-ID in the latest slot in which one or more CORESETs within the active BWP of the serving cell are configured for the UE. The CORESET is with the lowest COREST-ID in the latest slot in which one or more CORESETs within the active BWP of the serving cell are monitored by the UE.

All or some of above embodiments can be formed to a new embodiment.

Figure 16:
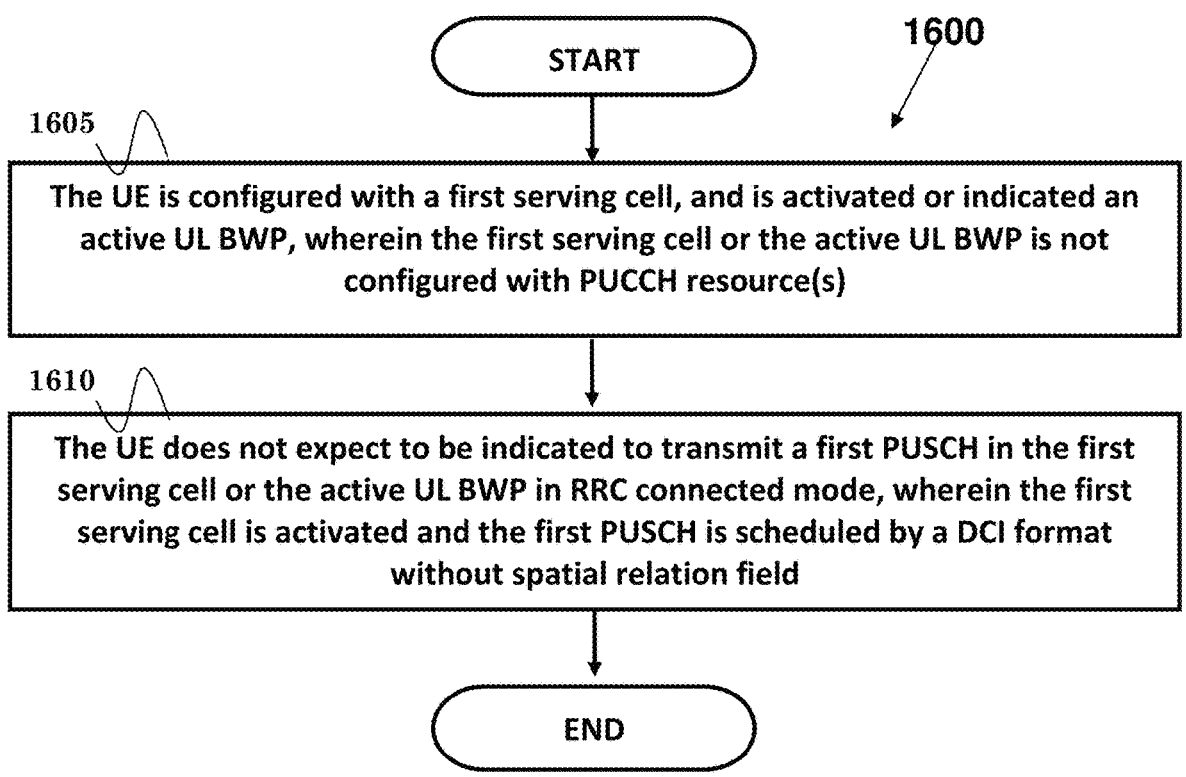
FIG. 16 is a flow chart according to one exemplary embodiment.

FIG. 16 is a flow chart 1600 according to one exemplary embodiment from the perspective of a UE. In step 1605, the UE is configured with a first serving cell, and is indicated to activate the first serving cell and an active UL BWP, wherein the first serving cell or the active UL BWP is not configured with Physical Uplink Control Channel (PUCCH) resource(s). In step 1610, the UE does not expect to be indicated to transmit a first Physical Uplink Shared Channel (PUSCH) in the first serving cell or the active UL BWP in Radio Resource Control (RRC) connected mode, wherein the first PUSCH is scheduled by a Downlink Control Information (DCI) format without spatial relation field.

In one embodiment, the UE could transmit a second PUSCH in the first serving cell through spatial relation indicated in a DCI format 0_1, wherein the second PUSCH is scheduled by the DCI format 0_1. Furthermore, the UE could transmit a third PUSCH in a second serving cell through a spatial relation for transmitting a PUCCH resource configured in active Uplink (UL) Bandwidth Part (BWP) in the second serving cell, wherein the third PUSCH is scheduled by a DCI format 0_0, and the PUCCH resource comprises the lowest resource Identity (ID) among all PUCCH resources configured in active Uplink (UL) Bandwidth Part (BWP) in the second serving cell.

In one embodiment, the UE does not expect to be configured with a search space for monitoring DCI format 0_0, wherein the search space is associated with a Control Resource Set (CORESET) monitored and/or received in the first serving cell.

In one embodiment, if the UE is indicated to transmit the first PUSCH in the first serving cell, wherein the first PUSCH is scheduled by the DCI format without spatial relation field, the UE could ignore and/or discard the scheduled resource for transmitting the first PUSCH, and/or could ignore and/or discard the DCI format without spatial relation field.

In one embodiment, if the UE is indicated to transmit the first PUSCH in the first serving cell, wherein the first PUSCH is scheduled by the DCI format without spatial relation field, the UE may not transmit the first PUSCH. Additionally or alternatively, if the UE is indicated to transmit the first PUSCH in the first serving cell, wherein the first PUSCH is scheduled by the DCI format without spatial relation field, the UE could transmit the first PUSCH via a spatial relation or spatial parameter or spatial domain transmission filter or transmission precoder which is determined by the UE.

In one embodiment, the DCI format without spatial relation field could be DCI format 0_0.

Referring back to FIGS. 3 and 4, in one exemplary embodiment of a UE, the device 300 includes a program code 312 stored in the memory 310. The CPU 308 could execute program code 312 to enable the UE (i) to be configured with a first serving cell, and is indicated to activate the first serving cell and an active UL BWP, wherein the first serving cell or the active UL BWP is not configured with PUCCH resource(s), and (ii) to not expect to be indicated to transmit a first PUSCH in the first serving cell or the active UL BWP in RRC connected mode, wherein the first PUSCH is scheduled by a DCI format without spatial relation field. Furthermore, the CPU 308 can execute the program code 312 to perform all of the above-described actions and steps or others described herein.

Figure 17:
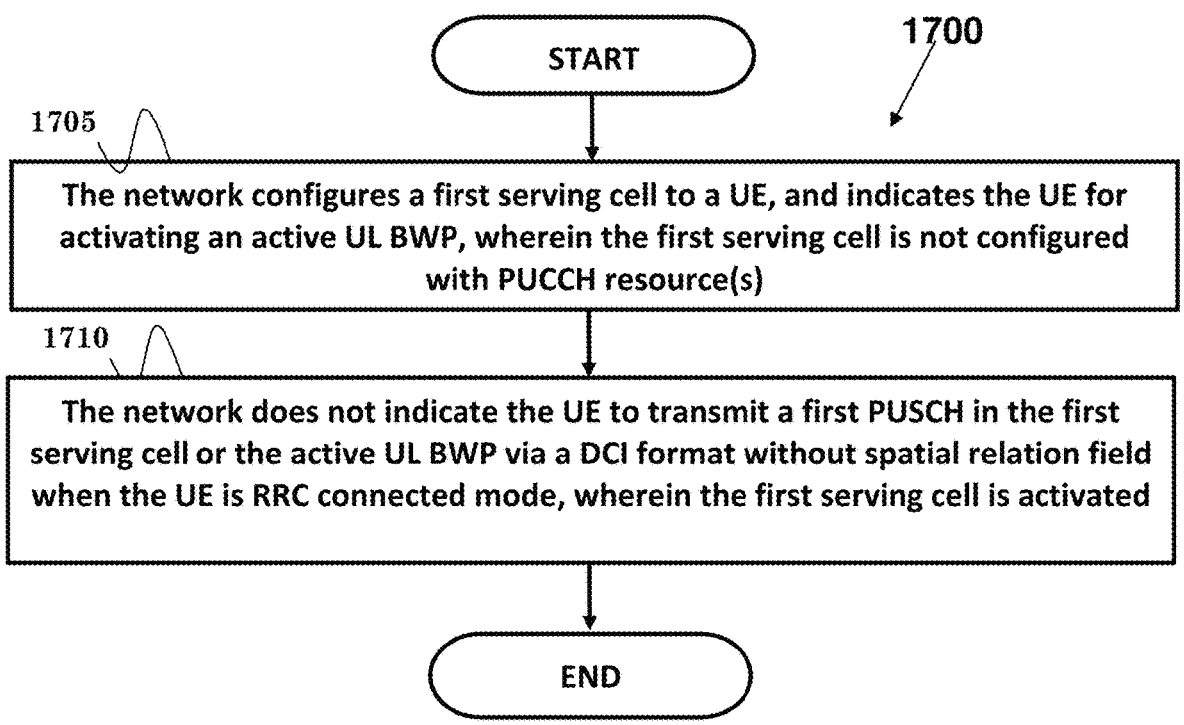
FIG. 17 is a flow chart according to one exemplary embodiment.

FIG. 17 is a flow chart 1700 according to one exemplary embodiment from the perspective of a network. In step 1705, the network configures a first serving cell to a User Equipment (UE), and indicates the UE to activate the first serving cell and an active UL BWP, wherein the first serving cell or the active UL BWP is not configured with Physical Uplink Control Channel (PUCCH) resource(s). In step 1710, the network does not indicate the UE to transmit a first Physical Uplink Shared Channel (PUSCH) in the first serving cell or the active UL BWP via a Downlink Control Information (DCI) format without spatial relation field when the UE is in Radio Resource Control (RRC) connected mode.

In one embodiment, the network may prevent from or not be allowed to indicate the UE to transmit the first PUSCH in the first serving cell via a DCI format without spatial relation field when the UE is in RRC connected mode. The network could indicate the UE to transmit a second PUSCH in the first serving cell through spatial relation indicated in a DCI format 0_1, wherein the second PUSCH is scheduled by the DCI format 0_1. The network could indicate the UE to transmit a third PUSCH in a second serving cell, wherein the third PUSCH is scheduled by a DCI format 0_0 and the third PUSCH is transmitted through a spatial relation for transmitting a PUCCH resource configured in active UL BWP in the second serving cell and comprising the lowest resource ID among all PUCCH resources configured in active UL BWP in the second serving cell.

In one embodiment, the network may not configure a search space to the UE, wherein the search space is associated with monitoring and/or receiving DCI format 0_0 in the first serving cell. If the network indicates the UE to transmit the first PUSCH in the first serving cell, wherein the first PUSCH is scheduled by the DCI format without spatial relation field, the network may not receive the first PUSCH.

In one embodiment, the DCI format without spatial relation field could be DCI format 0_0.

Referring back to FIGS. 3 and 4, in one exemplary embodiment of a network, the device 300 includes a program code 312 stored in the memory 310. The CPU 308 could execute program code 312 to enable the network (i) to configure a first serving cell to a UE and indicate the UE to activate the first serving cell and an active UL BWP, wherein the first serving cell or the active UL BWP is not configured with PUCCH resource(s), and (ii) to not indicate the UE to transmit a first PUSCH in the first serving cell or the active UL BWP via a DCI format without spatial relation field when the UE is in RRC connected mode. Furthermore, the CPU 308 can execute the program code 312 to perform all of the above-described actions and steps or others described herein.

Figure 18:
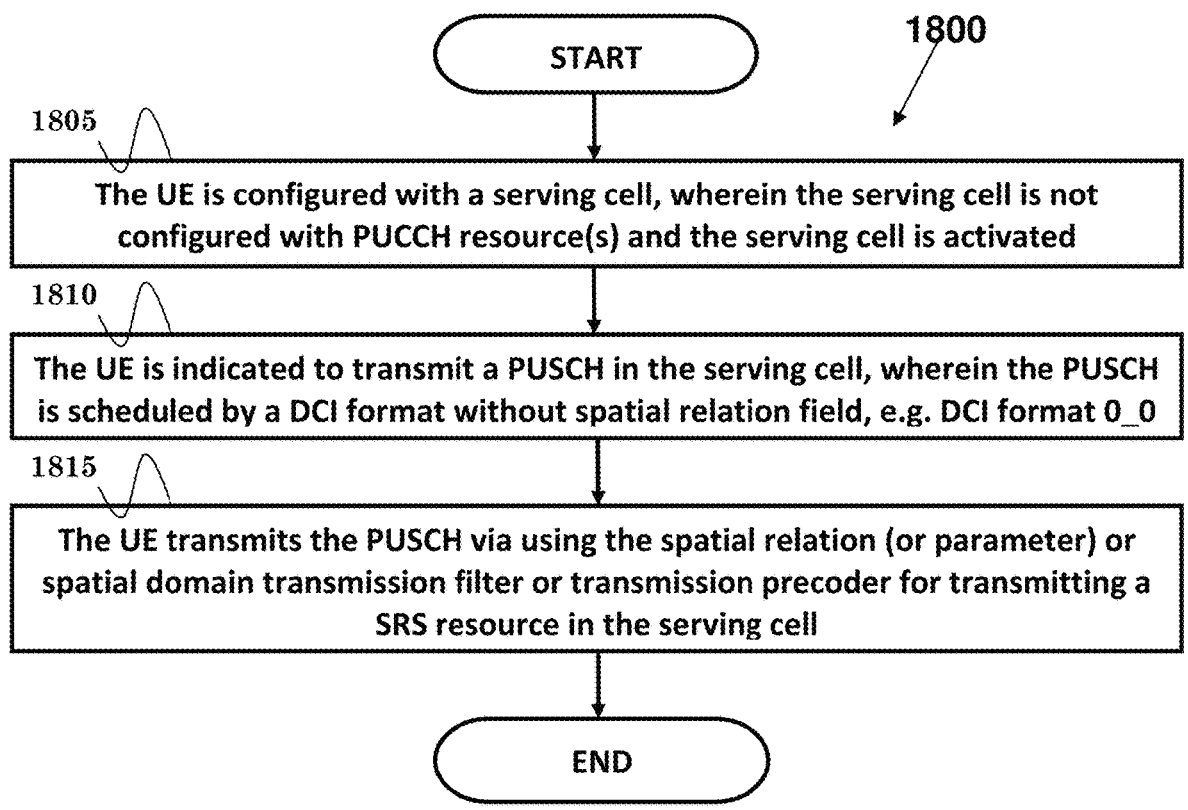
FIG. 18 is a flow chart according to one exemplary embodiment.

FIG. 18 is a flow chart 1800 according to one exemplary embodiment from the perspective of a UE. In step 1805, the UE is configured with a serving cell, wherein the serving cell is not configured with PUCCH resource(s) and the serving cell is activated. In step 1810, the UE is indicated to transmit a PUSCH in the serving cell, wherein the PUSCH is scheduled by a DCI format without spatial relation field, e.g. DCI format 0_0. In step 1815, the UE transmits the PUSCH via using the spatial relation (or parameter) or spatial domain transmission filter or transmission precoder for transmitting a Sounding Reference Signal (SRS) resource in the serving cell.

In one embodiment, the SRS resource could be a SRS resource with the lowest resource ID configured in active BWP in the serving cell, or a SRS resource with the lowest resource ID in a SRS resource set configured in active BWP in the serving cell. The SRS resource set could be with the lowest resource set ID among SRS resource sets for particular application or usage. In one embodiment, the SRS resource set could be configured for beam management, for SRS antenna switching, for codebook based uplink transmission, or for non-codebook based uplink transmission.

In one embodiment, the SRS resource could be a SRS resource associated with a DL reference signal resource or index of a DL reference signal resource, e.g. SSB resource, CSI-RS resource. The spatialRelationInfo configured for the SRS resource could indicate a DL reference signal resource or index of a DL reference signal resource (e.g. ssb-Index, csi-RS-index).

In one embodiment, the DL reference signal resource or index of the DL reference signal resource could be reported in the most recent beam report or the most recent CSI report for L1-RSRP. More specifically, the DL reference signal resource or index of the DL reference signal resource could be with the best measured quality (e.g. the largest RSRP, the largest SINR, the lowest BLER) in the most recent beam report or the most recent CSI report for L1-RSRP.

Referring back to FIGS. 3 and 4, in one exemplary embodiment of a UE, the device 300 includes a program code 312 stored in the memory 310. The CPU 308 could execute program code 312 to enable the UE (i) to be configured with a serving cell, wherein the serving cell is not configured with PUCCH resource(s) and the serving cell is activated, (ii) to be indicated to transmit a PUSCH in the serving cell, wherein the PUSCH is scheduled by a DCI format without spatial relation field, e.g. DCI format 0_0, and (iii) to transmit the PUSCH via using the spatial relation (or parameter) or spatial domain transmission filter or transmission precoder for transmitting a SRS resource in the serving cell. Furthermore, the CPU 308 can execute the program code 312 to perform all of the above-described actions and steps or others described herein.

Figure 19:
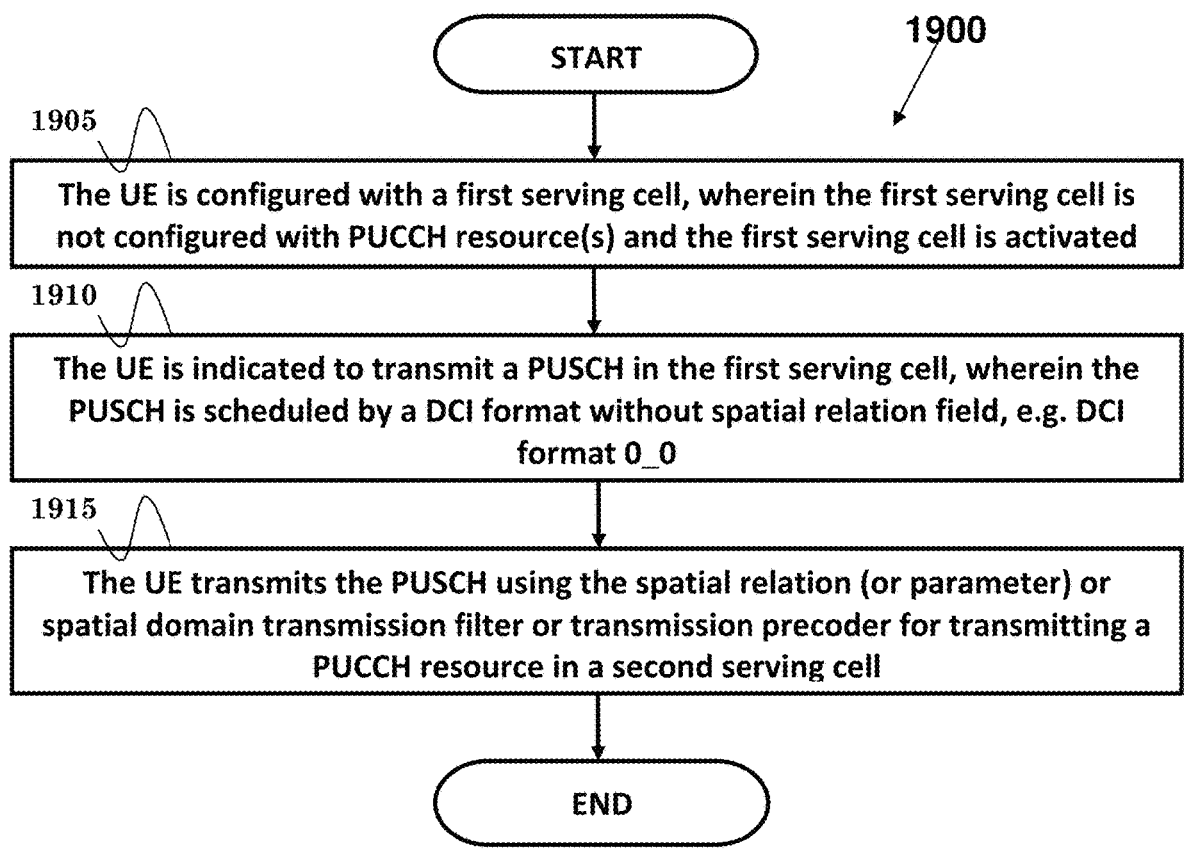
FIG. 19 is a flow chart according to one exemplary embodiment.

FIG. 19 is a flow chart 1900 according to one exemplary embodiment from the perspective of a UE. In step 1905, the UE is configured with a first serving cell, wherein the first serving cell is not configured with PUCCH resource(s) and the first serving cell is activated. In step 1910, the UE is indicated to transmit a PUSCH in the first serving cell, wherein the PUSCH is scheduled by a DCI format without spatial relation field, e.g. DCI format 0_0. In step 1915, the UE transmits the PUSCH via using the spatial relation (or parameter) or spatial domain transmission filter or transmission precoder for transmitting a PUCCH resource in a second serving cell.

In one embodiment, the PUCCH resource in the second serving cell could be a PUCCH resource with the lowest resource ID configured in active UL BWP in the second serving cell. The second serving cell could be a serving cell configured with PUCCH resource, e.g. PCell, PSCell. The spatial relation could be shared between the first serving cell and the second serving cell.

In one embodiment, the first serving cell and the second serving cell could be in the same PUCCH cell group. The second serving cell could be configured with uplink component carrier or uplink resource. The second serving cell could be activated.

Referring back to FIGS. 3 and 4, in one exemplary embodiment of a UE, the device 300 includes a program code 312 stored in the memory 310. The CPU 308 could execute program code 312 to enable the UE (i) to be configured with a first serving cell, wherein the first serving cell is not configured with PUCCH resource(s) and the first serving cell is activated, (ii) to be indicated to transmit a PUSCH in the first serving cell, wherein the PUSCH is scheduled by a DCI format without spatial relation field, e.g. DCI format 0_0, and (iii) to transmit the PUSCH via using the spatial relation (or parameter) or spatial domain transmission filter or transmission precoder for transmitting a PUCCH resource in a second serving cell. Furthermore, the CPU 308 can execute the program code 312 to perform all of the above-described actions and steps or others described herein.

Figure 20:
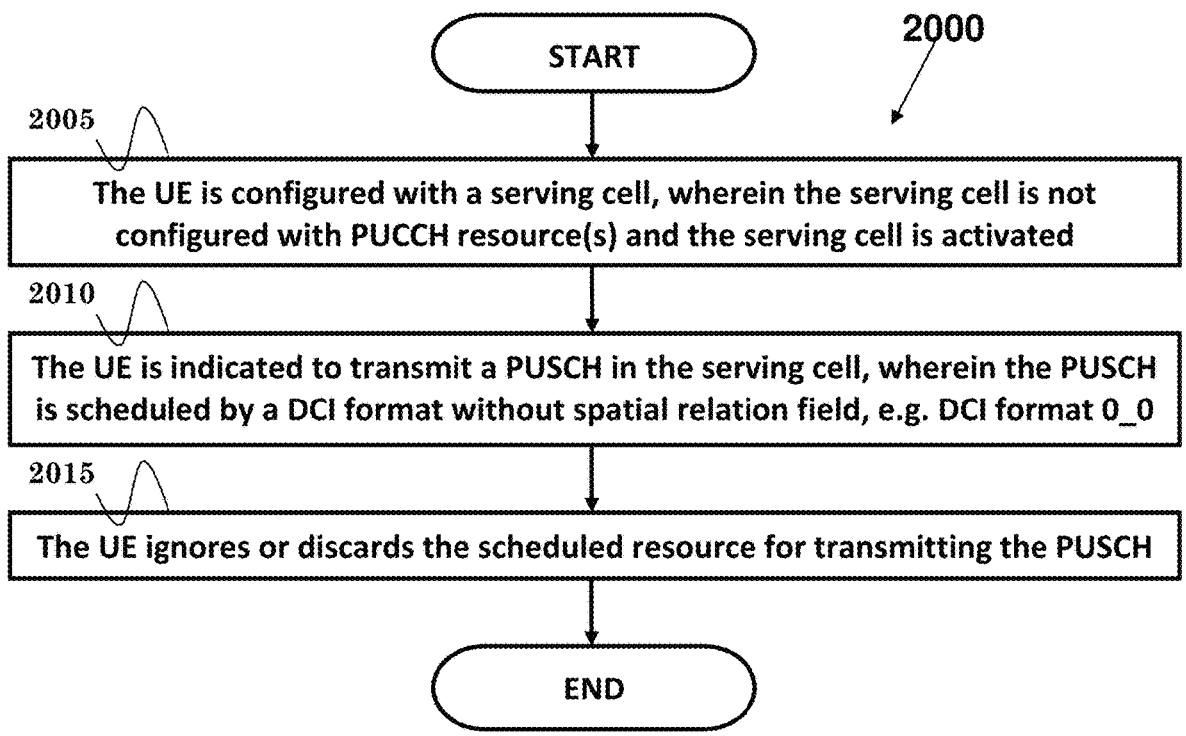
FIG. 20 is a flow chart according to one exemplary embodiment.

FIG. 20 is a flow chart 2000 according to one exemplary embodiment from the perspective of a UE. In step 2005, the UE is configured with a serving cell, wherein the serving cell is not configured with PUCCH resource(s) and the serving cell is activated. In step 2010, the UE is indicated to transmit a PUSCH in the serving cell, wherein the PUSCH is scheduled by a DCI format without spatial relation field, e.g. DCI format 0_0. In step 2015, the UE ignores or discards the scheduled resource for transmitting the PUSCH.

In one embodiment, the UE could ignore or discard the DCI format. The UE may not transmit the PUSCH. The UE could transmit the PUSCH via a spatial relation (or parameter) or spatial domain transmission filter or transmission precoder which is determined by the UE.

Referring back to FIGS. 3 and 4, in one exemplary embodiment of a UE, the device 300 includes a program code 312 stored in the memory 310. The CPU 308 could execute program code 312 to enable the UE (i) to be configured with a serving cell, wherein the serving cell is not configured with PUCCH resource(s) and the serving cell is activated, (ii) to be indicated to transmit a PUSCH in the serving cell, wherein the PUSCH is scheduled by a DCI format without spatial relation field, e.g. DCI format 0_0, and (iii) to ignore or discard the scheduled resource for transmitting the PUSCH. Furthermore, the CPU 308 can execute program code 312 to perform all of the above-described actions and steps or others described herein.

Figure 21:
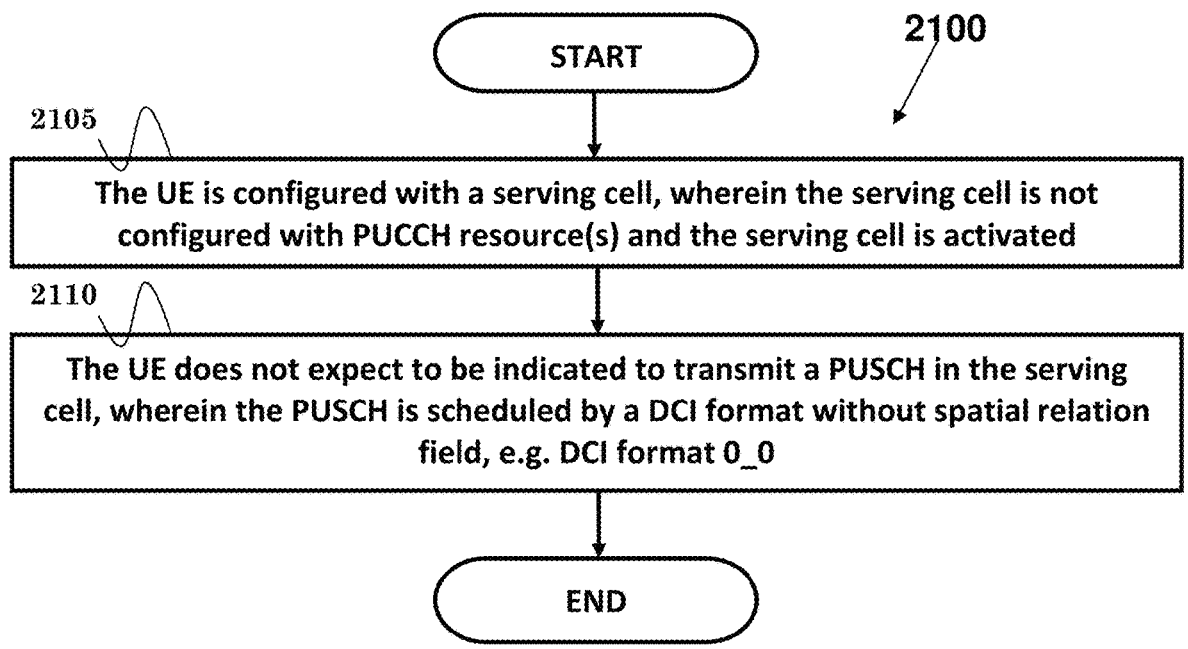
FIG. 21 is a flow chart according to one exemplary embodiment.

FIG. 21 is a flow chart 2100 according to one exemplary embodiment from the perspective of a UE. In step 2105, the UE is configured with a serving cell, wherein the serving cell is not configured with PUCCH resource(s) and the serving cell is activated. In step 2110, the UE does not expect to be indicated to transmit a PUSCH in the serving cell, wherein the PUSCH is scheduled by a DCI format without spatial relation field, e.g. DCI format 0_0.

In one embodiment, the UE may not expect to be configured with a search space configured with DCI format 0_0, i.e. dci-Formats is configured as formats0-0-And-1-0, wherein the search space is associated with a CORESET monitored or received in the serving cell. Furthermore, if the UE is indicated to transmit a PUSCH in the serving cell, wherein the PUSCH is scheduled by a DCI format without spatial relation field, e.g. DCI format 0_0, the UE may (i) ignore or discard the scheduled resource for transmitting the PUSCH, (ii) ignore or discard the DCI format, (iii) may not transmit the PUSCH, and/or (iv) may transmit the PUSCH via a spatial relation/parameter or spatial domain transmission filter or transmission precoder which is determined by the UE.

Referring back to FIGS. 3 and 4, in one exemplary embodiment of a UE, the device 300 includes a program code 312 stored in the memory 310. The CPU 308 could execute program code 312 to enable the UE (i) to be configured with a serving cell, wherein the serving cell is not configured with PUCCH resource(s) and the serving cell is activated, and (ii) to not expect to be indicated to transmit a PUSCH in the serving cell, wherein the PUSCH is scheduled by a DCI format without spatial relation field, e.g. DCI format 0_0. Furthermore, the CPU 308 can execute the program code 312 to perform all of the above-described actions and steps or others described herein.

Figure 22:
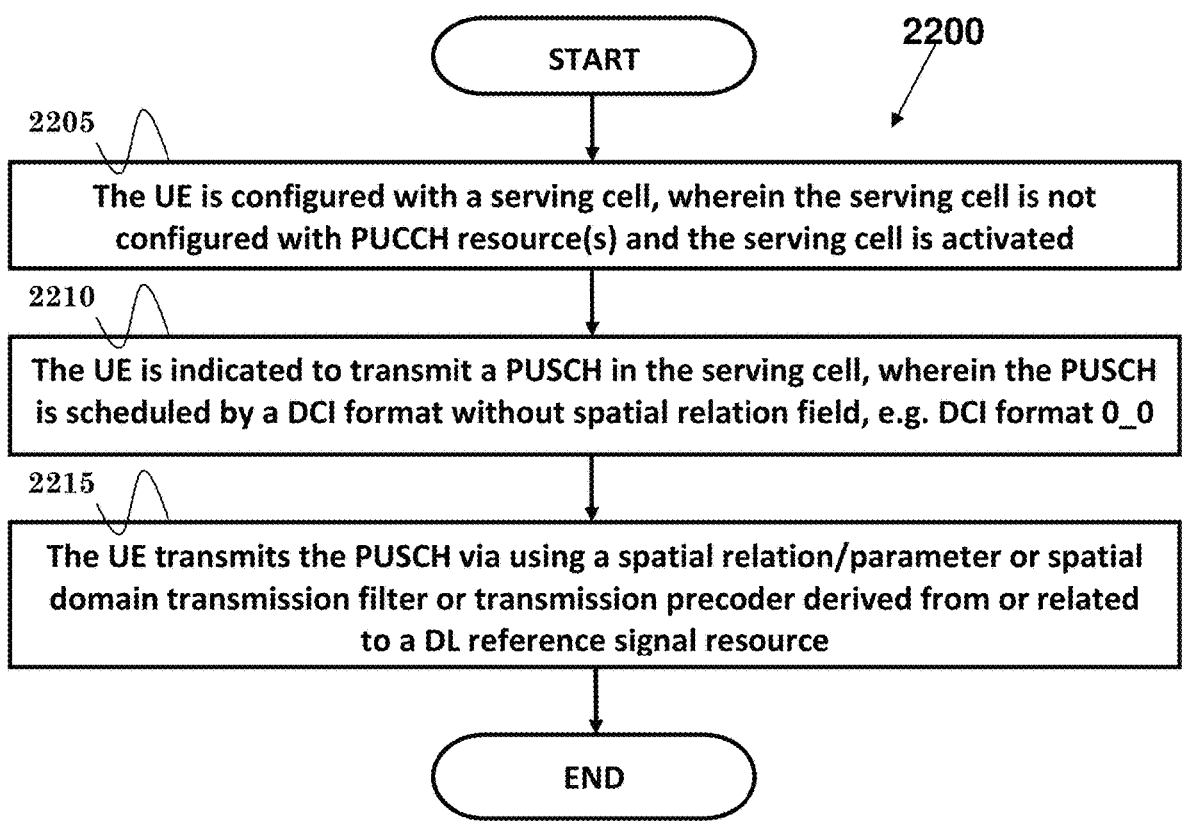
FIG. 22 is a flow chart according to one exemplary embodiment.

FIG. 22 is a flow chart 2200 according to one exemplary embodiment from the perspective of a UE. In step 2205, the UE is configured with a serving cell, wherein the serving cell is not configured with PUCCH resource(s) and the serving cell is activated. In step 2210, the UE is indicated to transmit a PUSCH in the serving cell, wherein the PUSCH is scheduled by a DCI format without spatial relation field, e.g. DCI format 0_0. In step 2215, the UE transmits the PUSCH via using a spatial relation/parameter or spatial domain transmission filter or transmission precoder derived from or related to a DL reference signal resource.

In one embodiment, the UE could transmit the PUSCH via using a spatial relation/parameter or spatial domain transmission filter or transmission precoder derived from or related to the spatial relation (or parameter) or spatial domain reception filter or beam for receiving the DL reference signal resource. The DL reference signal resource could be transmitted in the serving cell or in a serving cell other than the serving cell. The DL reference signal resource could be SSB resource or CSI-RS resource.

In one embodiment, the DL reference signal resource or index of the DL reference signal resource could be reported in the most recent beam report or the most recent CSI report for L1-RSRP. More specifically, the DL reference signal resource or index of the DL reference signal resource could be with the best measured quality (e.g. the largest RSRP, the largest SINR, the lowest BLER) in the most recent beam report or the most recent CSI report for L1-RSRP.

In one embodiment, the DL reference signal resource could be the same as a DL reference signal associated with a TCI state, wherein the TCI state is applied for receiving the CORESET in which the DCI is received. The antenna port of the DL reference signal resource and the DM-RS antenna port associated with PDCCH receptions in the CORESET in which the DCI is received are quasi co-located with respect to, e.g. delay spread, Doppler spread, Doppler shift, average delay, and spatial RX parameters.

In one embodiment, the DL reference signal resource could be the same as a DL reference signal associated with a TCI state, wherein the TCI state is applied for receiving the CORESET with the lowest CORESET-ID in the latest slot in which one or more CORESETs within the active BWP of the serving cell are configured for the UE. The antenna port of the DL reference signal resource and the DM-RS antenna port associated with PDCCH receptions in a CORESET could be quasi co-located with respect to, e.g. delay spread, Doppler spread, Doppler shift, average delay, and spatial RX parameters, wherein the CORESET is with the lowest COREST-ID in the latest slot in which one or more CORESETs within the active BWP of the serving cell are configured for the UE.

Referring back to FIGS. 3 and 4, in one exemplary embodiment of a UE, the device 300 includes a program code 312 stored in the memory 310. The CPU 308 could execute program code 312 to enable the UE (i) to be configured with a serving cell, wherein the serving cell is not configured with PUCCH resource(s) and the serving cell is activated, (ii) to be indicated to transmit a PUSCH in the serving cell, wherein the PUSCH is scheduled by a DCI format without spatial relation field, e.g. DCI format 0_0, and (iii) to transmit the PUSCH via using a spatial relation/parameter or spatial domain transmission filter or transmission precoder derived from or related to a DL reference signal resource. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclo-

The invention claimed is:

1. A method of a UE (User Equipment), comprising:
   the UE is configured with a first serving cell, and is indicated to activate the first serving cell and an active Uplink (UL) Bandwidth Part (BWP), wherein the first serving cell or the active UL BWP is not configured with Physical Uplink Control Channel (PUCCH) resource(s);
   the UE does not expect to be indicated to transmit a first Physical Uplink Shared Channel (PUSCH) in the first serving cell or the active UL BWP in Radio Resource Control (RRC) connected mode, wherein the first PUSCH is scheduled by a Downlink Control Information (DCI) format without spatial relation field; and
   the UE transmits a third PUSCH in a second serving cell through a spatial relation for transmitting a PUCCH resource configured in active UL BWP in the second serving cell, wherein the third PUSCH is scheduled by a DCI format 0_0, and the PUCCH resource comprises the lowest resource Identity (ID) among all PUCCH resources configured in the active UL BWP in the second serving cell.

2. The method of claim 1, wherein the UE transmits a second PUSCH in the first serving cell through spatial relation indicated in a DCI format 0_1, wherein the second PUSCH is scheduled by the DCI format 0_1.

3. The method of claim 1, wherein the UE does not expect to be configured with a search space for monitoring DCI format 0_0, wherein the search space is associated with a Control Resource Set (CORESET) monitored and/or received in the first serving cell.

4. The method of claim 1, wherein if the UE is indicated to transmit the first PUSCH in the first serving cell, wherein the first PUSCH is scheduled by the DCI format without spatial relation field, the UE ignores and/or discards the scheduled resource for transmitting the first PUSCH.

5. The method of claim 1, wherein if the UE is indicated to transmit the first PUSCH in the first serving cell, wherein the first PUSCH is scheduled by the DCI format without spatial relation field, the UE ignores and/or discards the DCI format without spatial relation field.

6. The method of claim 1, wherein if the UE is indicated to transmit the first PUSCH in the first serving cell, wherein the first PUSCH is scheduled by the DCI format without spatial relation field, the UE does not transmit the first PUSCH.

7. The method of claim 1, wherein if the UE is indicated to transmit the first PUSCH in the first serving cell, wherein the first PUSCH is scheduled by the DCI format without spatial relation field, the UE transmits the first PUSCH via a spatial relation or spatial parameter or spatial domain transmission filter or transmission precoder which is determined by the UE.

8. The method of claim 1, wherein the DCI format without spatial relation field is DCI format 0_0.

9. A method for a network, comprising:
   the network configures a first serving cell to a User Equipment (UE), and indicates the UE to activate the first serving cell and an active Uplink (UL) Bandwidth Part (BWP), wherein the first serving cell or the active UL BWP is not configured with Physical Uplink Control Channel (PUCCH) resource(s);
   the network does not indicate the UE to transmit a first Physical Uplink Shared Channel (PUSCH) in the first serving cell or the active UL BWP via a Downlink Control Information (DCI) format without spatial relation field when the UE is in Radio Resource Control (RRC) connected mode; and
   the network indicates to the UE to transmit a third PUSCH in a second serving cell, wherein the third PUSCH is scheduled by a DCI format 0_0 and the third PUSCH is transmitted through a spatial relation for transmitting a PUCCH resource configured in active UL BWP in the second serving cell and comprising the lowest resource ID among all PUCCH resources configured in active UL BWP in the second serving cell.

10. The method of claim 9, wherein the network prevents from or is not allowed to indicate the UE to transmit the first PUSCH in the first serving cell via a DCI format without spatial relation field when the UE is in RRC connected mode.

11. The method of claim 9, wherein the network indicates to the UE to transmit a second PUSCH in the first serving cell through spatial relation indicated in a DCI format 0_1, wherein the second PUSCH is scheduled by the DCI format 0_1.

12. The method of claim 9, wherein the network does not configure a search space to the UE, wherein the search space is associated with monitoring and/or receiving DCI format 0_0 in the first serving cell.

13. The method of claim 9, wherein if the network indicates the UE to transmit the first PUSCH in the first serving cell, wherein the first PUSCH is scheduled by the DCI format without spatial relation field, the network does not receive the first PUSCH.

14. The method of claim 9, wherein the DCI format without spatial relation field is DCI format 0_0.

15. The method of claim 1, wherein the first serving cell or the active UL BWP not configured with PUCCH resource(s) means or comprises the first serving cell or the active UL BWP without at least one PUCCH resource providing spatial relation configured.

16. The method of claim 9, wherein the first serving cell or the active UL BWP not configured with PUCCH resource(s) means or comprises the first serving cell or the active UL BWP without at least one PUCCH resource providing spatial relation configured.

17. A UE (User Equipment), comprising:
   a control circuit;
   a processor installed in the control circuit; and
   a memory installed in the control circuit and operatively coupled to the processor, wherein the processor is configured to execute a program code stored in the memory to:
   be configured with a first serving cell, and being indicated to activate the first serving cell and an active Uplink (UL) Bandwidth Part (BWP), wherein the first serving cell or the active UL BWP is not configured with Physical Uplink Control Channel (PUCCH) resource(s);
   not expect to be indicated to transmit a first Physical Uplink Shared Channel (PUSCH) in the first serving cell or the active UL BWP in Radio Resource Control (RRC) connected mode, wherein the first PUSCH is scheduled by a Downlink Control Information (DCI) format without spatial relation field; and
   transmit a third PUSCH in a second serving cell through a spatial relation for transmitting a PUCCH resource configured in active UL BWP in the second serving cell, wherein the third PUSCH is scheduled by a DCI format 0_0, and the PUCCH resource comprises the lowest resource Identity (ID) among all PUCCH resources configured in the active UL BWP in the second serving cell.

18. A network node, comprising:
a control circuit;
a processor installed in the control circuit; and
a memory installed in the control circuit and operatively coupled to the processor, wherein the processor is configured to execute a program code stored in the memory to:
- configure a first serving cell to a User Equipment (UE), and indicating the UE to activate the first serving cell and an active Uplink (UL) Bandwidth Part (BWP), wherein the first serving cell or the active UL BWP is not configured with Physical Uplink Control Channel (PUCCH) resource(s);
- prevent from or not be allowed to indicate the UE to transmit a first Physical Uplink Shared Channel (PUSCH) in the first serving cell or the active UL BWP via a Downlink Control Information (DCI) format without spatial relation field when the UE is in Radio Resource Control (RRC) connected mode; and
- indicate to the UE to transmit a third PUSCH in a second serving cell, wherein the third PUSCH is scheduled by a DCI format 0_0 and the third PUSCH is transmitted through a spatial relation for transmitting a PUCCH resource configured in active UL BWP in the second serving cell and comprising the lowest resource ID among all PUCCH resources configured in active UL BWP in the second serving cell.

* * * * *